(12) United States Patent
David

(10) Patent No.: US 10,348,166 B2
(45) Date of Patent: Jul. 9, 2019

(54) MOTOR WITH ENCODER FOR ROBOTIC CAMERA SYSTEMS

(71) Applicant: Steven W. David, Anthem, AZ (US)

(72) Inventor: Steven W. David, Anthem, AZ (US)

(*) Notice: Subject to any disclaimer, the term of this patent is extended or adjusted under 35 U.S.C. 154(b) by 16 days.

(21) Appl. No.: 15/476,375

(22) Filed: Mar. 31, 2017

(65) Prior Publication Data

US 2017/0289456 A1     Oct. 5, 2017

Related U.S. Application Data

(60) Provisional application No. 62/316,324, filed on Mar. 31, 2016, provisional application No. 62/316,337, (Continued)

(51) Int. Cl.
| | | |
|---|---|---|
| *H02K 11/21* | (2016.01) | |
| *H02K 1/27* | (2006.01) | |
| *H02K 5/173* | (2006.01) | |
| *H02K 5/15* | (2006.01) | |
| *H02K 24/00* | (2006.01) | |
| *B25J 9/02* | (2006.01) | |
| *B25J 13/08* | (2006.01) | |
| *H04N 5/232* | (2006.01) | |
| *G03B 17/56* | (2006.01) | |

(52) U.S. Cl.
CPC ............ *H02K 11/21* (2016.01); *B25J 9/02* (2013.01); *B25J 13/088* (2013.01); *H02K 1/2753* (2013.01); *H02K 5/15* (2013.01); *H02K 5/1732* (2013.01); *H02K 24/00* (2013.01); *G03B 17/563* (2013.01); *H04N 5/23203* (2013.01); *H04N 5/23241* (2013.01); *Y10S 901/23* (2013.01)

(58) Field of Classification Search
CPC ........ H02K 24/00; H02K 5/15; H02K 1/2753; H02K 5/1732; H02K 11/00; H02K 11/20; H02K 11/21; H02K 11/215; H02K 11/22; H02K 11/23; H02K 11/24; Y10S 901/23; B25J 13/08; B25J 13/088; B25J 9/02; G03B 17/56; G03B 17/563
USPC .......................................................... 310/68
See application file for complete search history.

(56) References Cited

U.S. PATENT DOCUMENTS

| | | | |
|---|---|---|---|
| 2005/0033547 A1* | 2/2005 | Morishita | ............. B66B 1/3492 |
| | | | 702/147 |
| 2009/0315433 A1* | 12/2009 | Siraky | .................... H02K 11/21 |
| | | | 310/68 B |

(Continued)

*Primary Examiner* — Twyler L Haskins
*Assistant Examiner* — Akshay Trehan
(74) *Attorney, Agent, or Firm* — Schmeiser, Olsen & Watts LLP

(57) ABSTRACT

A direct drive servo motor is provided and may include a quadrature encoder and a silicone rubber sleeve affixed to the encoder's shaft that is attached to the rotor hub and may also include an axle fixed to the rotor hub, inner and outer bearings, front and rear bearing plates, an outer stator, and an inner rotor rare earth magnet ring. A computer-controlled camera system is also provided and includes a direct drive camera gimbal; a pan-bar system; a robotic control system; a master interconnect unit; custom control software; and a track and gantry system. A universal camera tripod head adapter is also provided and includes front and rear clamps, a clamp handle, side and rear brackets and a silicone rubber sleeve affixed to the shaft of each encoder that rides on the pan and tilt axis lips of a camera tripod head.

6 Claims, 27 Drawing Sheets

Related U.S. Application Data filed on Mar. 31, 2016, provisional application No. 62/316,343, filed on Mar. 31, 2016.

(56) References Cited

U.S. PATENT DOCUMENTS

| | | | |
|---|---|---|---|
| 2012/0139372 A1* | 6/2012 | Nakano | H02K 1/148 310/83 |
| 2012/0176007 A1* | 7/2012 | Takeuchi | H02K 7/116 310/68 B |
| 2014/0021279 A1* | 1/2014 | Rittler | H02K 1/148 241/117 |
| 2016/0056691 A1* | 2/2016 | Hale | H02K 11/21 310/68 B |
| 2016/0084293 A1* | 3/2016 | Ehrmann | F16C 3/02 310/68 B |
| 2016/0241105 A1* | 8/2016 | Moore | F16H 1/10 |

* cited by examiner

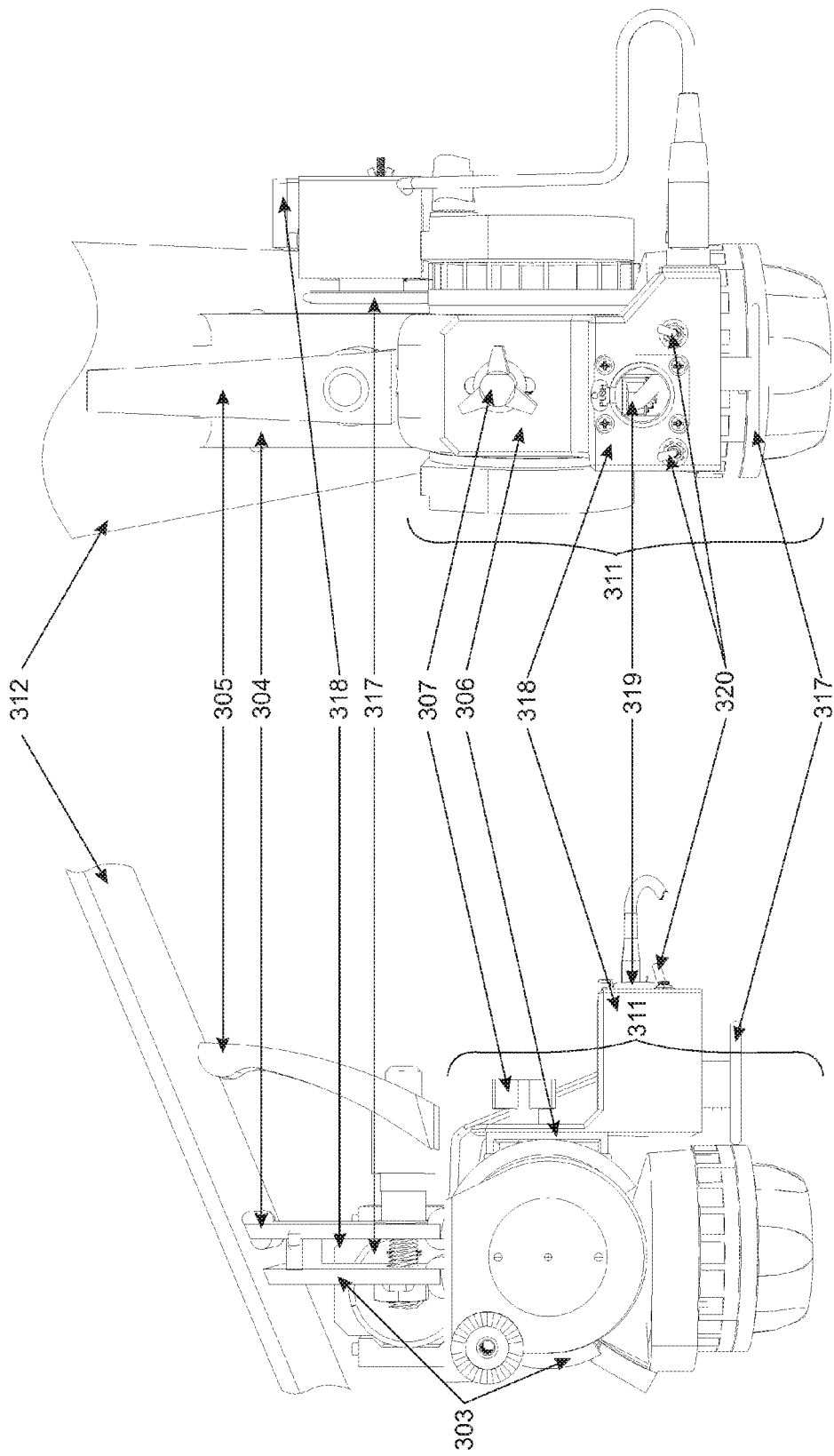

MOTOR WITH ENCODER FOR ROBOTIC CAMERA SYSTEMS

CROSS REFERENCE TO RELATED APPLICATION[S]

This application claims priority to U.S. Provisional Patent Application entitled "APPLICATION OF RATIO-METRIC MULTIPLICATION TO GENERATE ULTRA HIGH RESOLUTION IN DIRECT DRIVE SERVO MOTORS," Ser. No. 62/316,324, filed Mar. 31, 2016, U.S. Provisional Patent Application entitled "ROBOTIC, GYROSCOPICALLY STABILIZED, COMPUTER-CONTROLLED CAMERA SYSTEM," Ser. No. 62/316,337, filed on Mar. 31, 2016, and U.S. Provisional Patent Application entitled "UNIVERSAL CAMERA TRIPOD HEAD ADAPTER," Ser. No. 62/316,343, filed on Mar. 31, 2016, the disclosures of which are hereby incorporated entirely herein by reference.

BACKGROUND OF THE INVENTION

Technical Field

This invention relates to a direct drive, three phase axial servo motor; and more particularly to the use of ratio-metric multiplication to significantly increase the resolution in a zero-cogging, direct drive, three-phase axial servo motor. This invention also relates generally to a robotic, gyroscopically stabilized, computer-controlled camera system; and more particularly, to an integrated system comprised of a robotic, gyroscopically stabilized, 3-axis, direct drive camera gimbal; a pan-bar system; an 8-axis robotic control system; a master interconnect unit; custom control software; and a track and gantry system for use with large cameras in the television, motion picture, and video production industries. This invention further relates generally to equipment for operating remote camera control systems; and more particularly, to a camera tripod head adapter that mounts pan and tilt encoders onto virtually any basic (i.e., non-encoder equipped) camera tripod head to replicate the functionality of more sophisticated integrated (i.e., encoder equipped) camera tripod heads at a lower cost.

State of the Art

Large robotic camera systems require a servo motor that performs highly accurate positioning. Direct drive motors are commonly used to power these systems but suffer from two types of problems. First, some direct drive servo motors, though affordable, have low encoder resolution, thereby resulting in low positional accuracy. Other technical issues with lower cost motors include poor repeatability, axial and radial loading tradeoff, poor mounting flexibility, and design and manufacturing complexity. Second, more sophisticated direct drive servo motors exist that have higher resolution and solve many of the other technical problems, but are more expensive, exceeding the budgetary constraints of independent filmmakers.

In order to produce high-end television, motion picture, and video products, camera operators commonly utilize large robotic camera systems that enable stable, high precision camera movement; remote control of the camera (i.e., with the operator not immediately behind the camera operating it by hand); repeatable camera system movements; and accommodate one or multiple cameras. Various robotic camera systems exist to achieve these results but suffer from two types of problems. First, some camera systems, though affordable, have various technical issues such as open-rather than closed-loop servo systems, geared servo motors instead of direct drive motors, poor or no gyroscopic stabilization resulting in unsteady images, inadequate control systems, limited or no computer software control, lack of recording and/or repeatability, jerkiness due to gear backlash and poor torque linearity, inability to use in conjunction with special effects software, lack of versatility and/or configurability, poor resolution, and inadequate human interface of controls (e.g., joysticks). Second, more advanced systems exist that solve many of these technical problems, but are more expensive, exceeding the budgetary constraints of independent filmmakers.

Robotic camera systems require an operator to control the pan (X-axis) and tilt (Y-axis) camera functions remotely. Remote camera control systems, including camera tripod heads, mounted on a camera tripod are commonly used to drive these systems. Encoders are used to track the pan and tilt functions to control the camera as well as to record the camera movement for use with special effects software. Existing camera tripod heads, both fluid and friction types, incorporate encoders within the camera tripod head into a single integrated component but are expensive, exceeding the budgetary constraints of independent filmmakers. In addition, because the encoders are built into existing integrated camera tripod heads, only the encoders installed by the manufacturer can be used, reducing encoder options.

DISCLOSURE OF THE INVENTION

Embodiments of the invention provide, at a lower cost of production, a mechanical design for significantly increasing encoder resolution in a direct drive servo motor that also offers improved repeatability, incorporates both axial and radial loading, provides better mounting flexibility, and has decreased design and manufacturing complexity. Embodiments may include the use of a relatively low resolution quadrature encoder with a silicone rubber sleeve or small spur gear affixed to the shaft of said encoder that rides on the outer circumference of the rotor hub of the direct drive servo motor for use with large robotic camera gimbal systems or any high precision robotic application.

Existing mechanical design mates the encoder with the motor axle. In the present invention, significantly higher resolution is achieved through ratio-metric multiplication by mating a relatively low resolution quadrature encoder with the rotor hub of the motor, where a silicone rubber sleeve or small spur gear is affixed to the shaft of the encoder to ride on the outer circumference of the rotor hub. Control circuitry capable of counting rising and falling edges of both the A and B quadrature channels further increases the encoder resolution.

Aspects of the present invention include:
1. Mating of the encoder on the rotor hub rather than in line with the axle of the motor.
2. Ratio-metric multiplication of an inexpensive, low resolution encoder that improves upon the encoder resolution of existing similar motors.
3. Front and rear heavy duty precision bearings, seated in fortified front and rear bearing plates and walls, improve repeatability and increase axial and radial loading as well as shear loads that can be introduced to the shaft compared to existing similar motors.
4. With a separate axle and axle plate, the motor is designed with multiple mounting options, making it highly configurable for various applications while remaining simple in design and assembly compared to existing similar motors.

The direct drive motor of the current invention comprises an outer stator, an inner rotor comprising a ring of rare earth magnets situated inside the outer stator, a spoked rotor hub having an inside portion to which the axle is fixed, and an inner bearing and outer bearing for supporting the axle. An encoder is fastened to the rear bearing plate; a silicone rubber sleeve affixed to the encoder's shaft rides on the rotor hub. In an alternative embodiment, the silicone rubber sleeve can be replaced with a small spur gear and a ring gear can be added to increase repeatability and precision registration of the encoder and the axle compared to the original friction assembly.

Other Embodiments of the invention to provide an integrated robotic, gyroscopically stabilized, computer-controlled camera system. Aspects of the present invention may include:
1. closed-rather than open-loop servo systems
2. direct drive servo motors instead of geared motors
3. gyroscopic stabilization
4. inadequate control systems
5. computer software control
6. recording and repeatability
7. no gear backlash or poor torque linearity
8. usable in conjunction with special effects software
9. versatile configurable
10. high resolution
11. pan-bar system to facilitate human interface of controls The robotic camera control system of the current invention is comprised of six main components: a robotic, gyroscopically stabilized, 3-axis, direct drive camera gimbal; a pan-bar system; an 8-axis robotic control system; a master interconnect unit; custom control software; and a track and gantry system.

Yet other embodiments of the invention may provide a universal camera tripod head adapter that mates two encoders directly to the pan and tilt axes (i.e., X and Y axes) of basic tripod camera heads. The present invention offers comparable functionality and precision of integrated camera tripod heads at a lower cost of production, allows the use of different encoders, and can be used on virtually any basic camera tripod head.

Aspects of the present invention include the following:
1. The adapter provides the ability to mount pan and tilt encoders onto virtually any basic camera tripod head, converting it into an encoder-equipped camera tripod head.
2. The adapter provides the ability to change encoders, not limiting the user to the encoders installed by the manufacturer into integrated camera tripod heads.
3. The adapter provides the ability to substitute potentiometers for the encoders for control systems requiring variable resistance.
4. The adapter provides comparable functionality and precision at a lower cost of production than integrated camera tripod heads.

In addition to these improvements upon existing camera tripod heads, the adapter is designed for quick and basic mounting and unmounting through a simple clamp design.

The camera tripod head adapter of the current invention comprises front and rear body clamps, a clamp handle, tilt and pan encoder brackets, a pan encoder bracket clamp, and a ball adapter plate. An encoder is fastened to each encoder bracket; a silicone rubber sleeve affixed to the shaft of each encoder rides on the pan and tilt axis lips of the tripod camera head. The adapter may include an accessory mounting plate.

Several alternative embodiments are possible:
1. The ball adapter plate can be replaced with a ball spacer for attaching to a tripod with a bowl receiver.
2. The silicone rubber sleeve can be replaced with a friction drive wheel to allow the encoders to be mounted in different places to accommodate different camera tripod head designs.
3. A connector housing can be added to simplify connection to a controller with processing electronics. Switches can be added to the connector housing to reverse the sensing direction of the encoders to accommodate user preferences.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 32A is a close-up view of an alternative embodiment where a friction drive wheel replaces the silicone rubber sleeve.

FIG. 32B is a close-up view of an alternative embodiment showing connector housing and directional switches.

DETAILED DESCRIPTION OF EMBODIMENTS OF THE INVENTION

Figure 1:
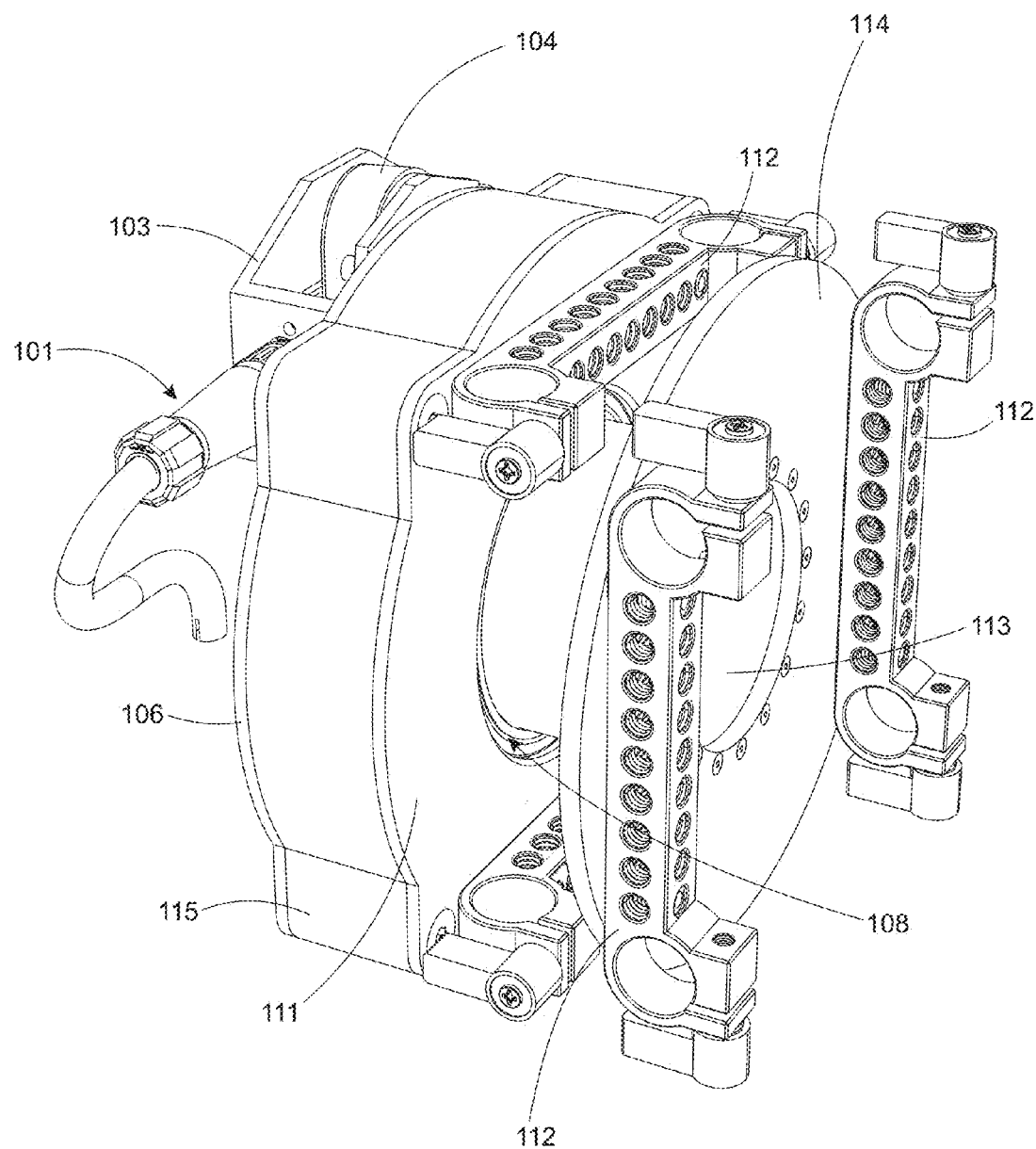
FIG. 1 is an assembled general front view of a direct drive motor in accordance with the present invention.

Some embodiments of the present invention relate to a mechanical design for generating ultra high resolution in a zero-cogging, direct drive, three-phase axial servo motor for use on large robotic camera gimbal systems or any high precision, heavy duty robotic application. Some embodiments of the present invention relate to a robotic, gyroscopically stabilized, computer-controlled camera system an integrated solution for use in film, television, and video production. Further still, some embodiments of the present invention relate to a tripod camera head adapter for use with remote camera control systems.

Three-Phase Axial Servo Motor

Referring to the drawings, FIGS. 1-5 depict front and rear views of an assembled direct drive motor, an exploded view, and cross-sectional views of a direct drive motor in accordance with the present invention. The direct drive motor may include a front bearing plate 111, a rear bearing plate 106, an axle 113, an axle plate 114, two heavy duty precision bearings 108, a rotor rare earth magnet ring 109, a three-phase stator 110, a rotor hub 107, and a motor housing 115. The motor may further include a low resolution quadrature encoder 104, an encoder housing 103, and a silicone rubber sleeve 105 affixed to the encoder 104 shaft to ride on the rotor hub 107, as will be discussed in greater detail with respect to FIGS. 6 and 7. Further still, the motor may include a connector plug 101 and connector jack 102 for power and control signals, and rod clamps 112 for mounting the motor. Alternatively, the friction version of the motor as described above can be modified to a gear drive version by replacing the silicon rubber sleeve 105 with a small spur gear 116 and adding a ring gear 117, as will be discussed further with respect to FIG. 8.

In order to illustrate how ratio-metric multiplication is applied to significantly increase the resolution of a direct drive servo motor in accordance with the current invention, the assembly of the illustrative motor is discussed first, in connection with FIGS. 1-5. The bearings 108 are pressed into the front bearing plate 111 and rear bearing plate 106 and are engineered in such a way into the overall design as to create maximum axial, radial, and shear capability for the axle 113, making these motors very versatile with multiple applications. The rear axle plate 106 is attached to the rear of the motor housing 115 with four precision-registered countersunk screws. The rotor hub 107 slides onto the axle 113 and is attached with four screws. The rotor magnet ring 109 press fits onto the rotor hub 107. The stator 110 press fits into the motor housing 115. The rotor hub 107, rotor magnet ring 109, and axle 113 slide through the front bearing plate 111. The rear bearing plate 106 and motor housing 115 slide onto the axle 113. The front bearing plate 111 is attached to the motor housing 115 with precision-registered countersunk screws, thus creating a precision alignment between the front bearing plate 111 and the rear bearing plate 106.

Figure 2:
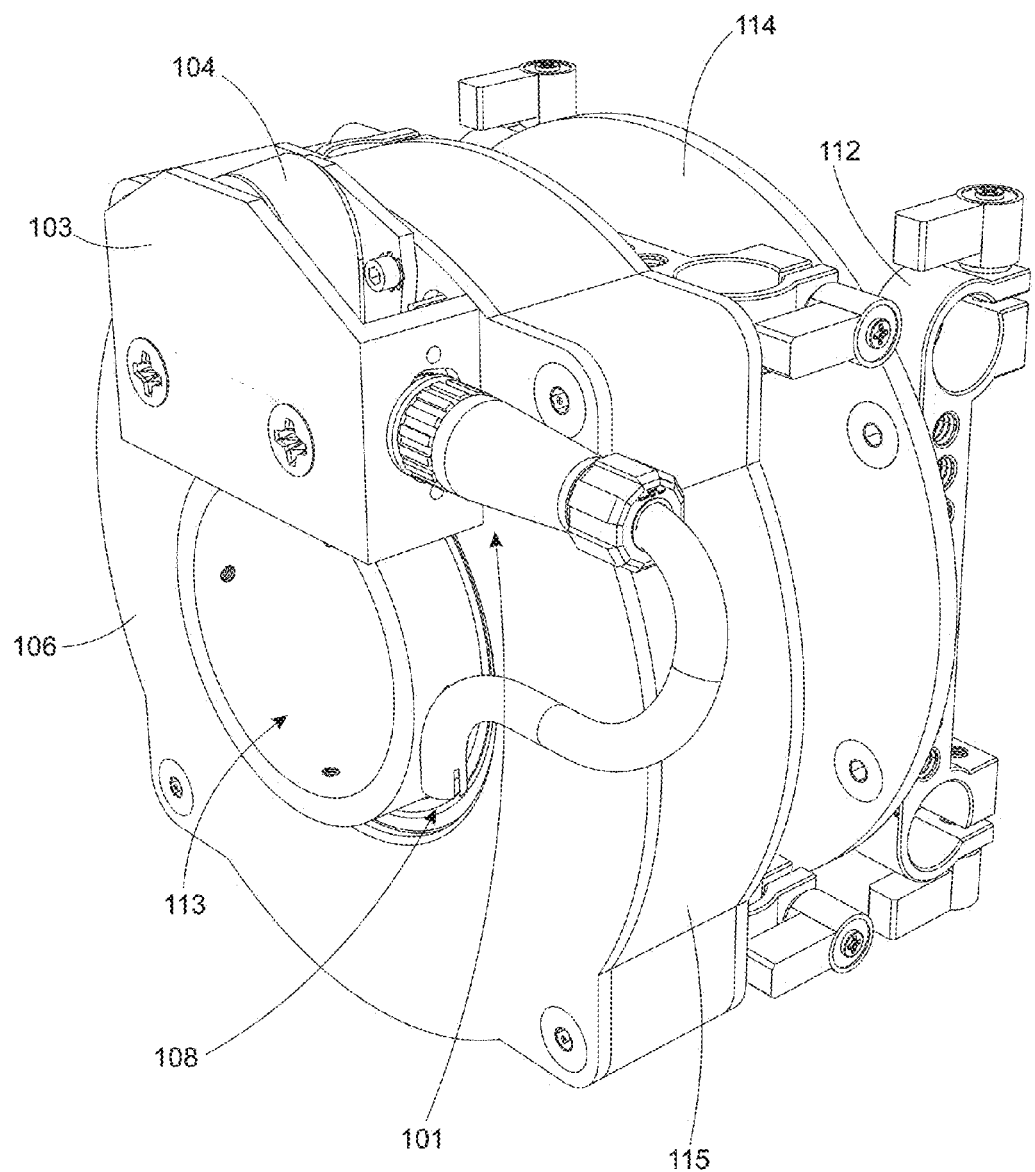
FIG. 2 is an assembled general rear view of a direct drive motor in accordance with the present invention.
Figure 3:
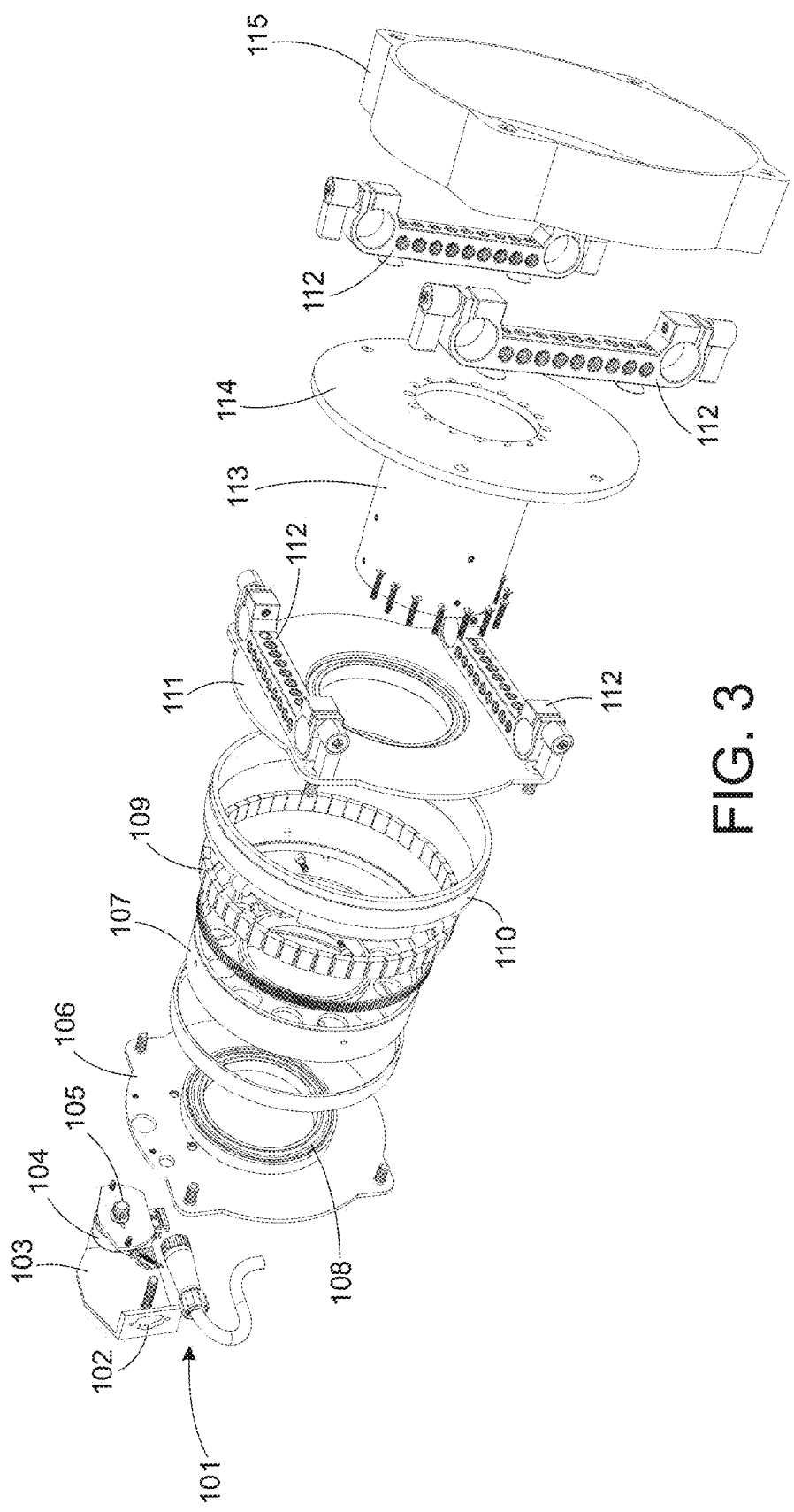
FIG. 3 is an exploded view of a direct drive motor in accordance with the present invention.
Figure 4:
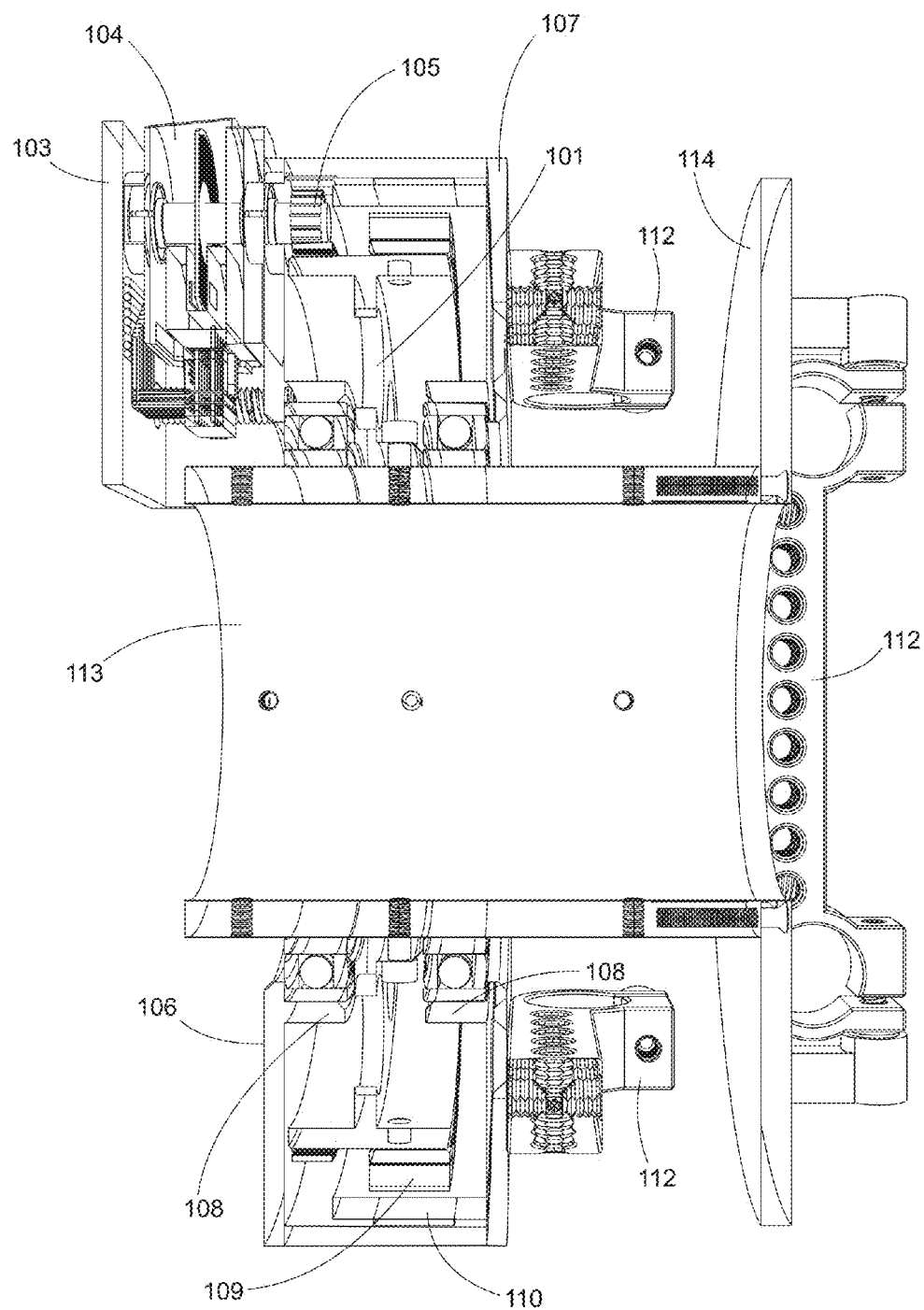
FIG. 4 is a cross sectional view taken along the rotational axis of a direct drive motor in accordance with the present invention.
Figure 5:
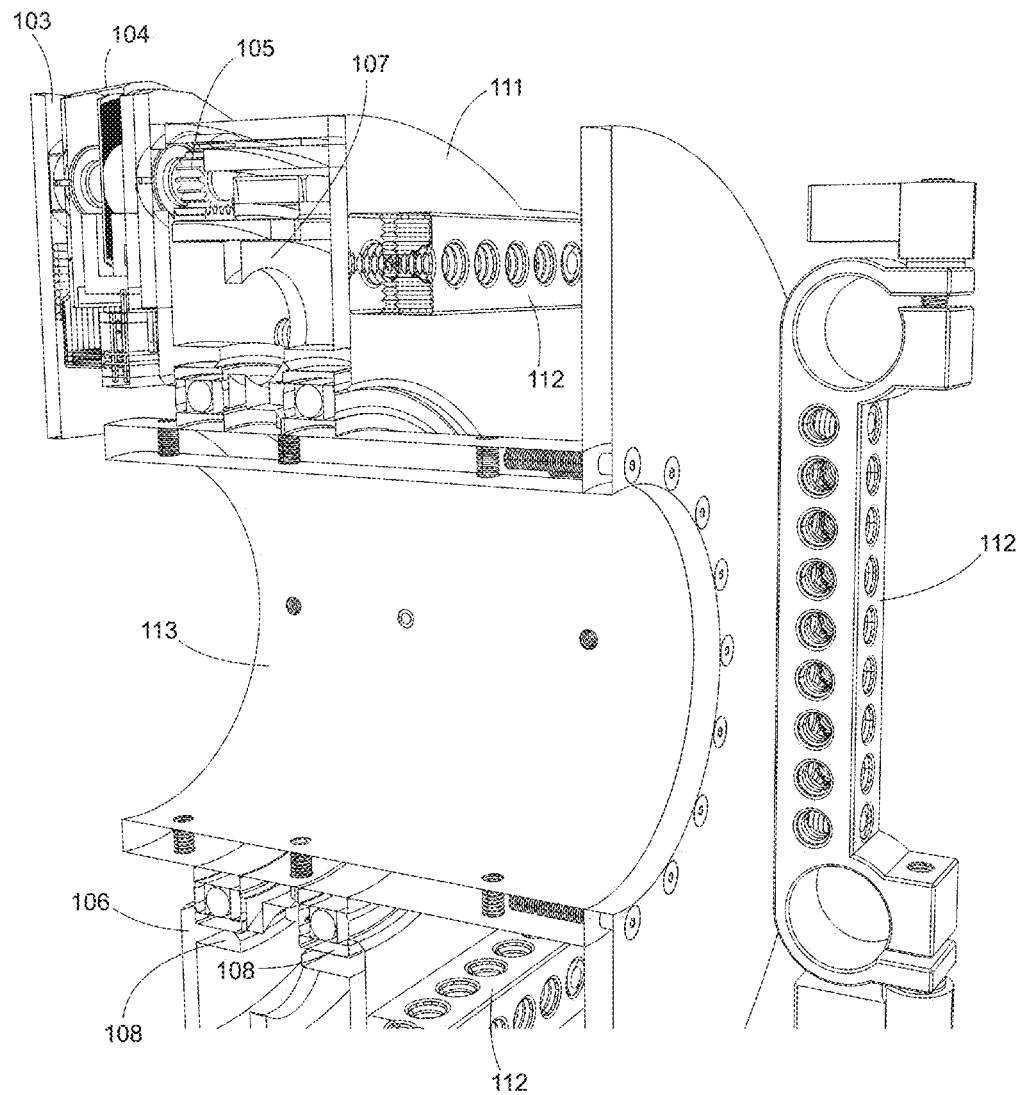
FIG. 5 is a 3-dimensional cross sectional view of a direct drive motor in accordance with the present invention at an angle.
Figure 6:
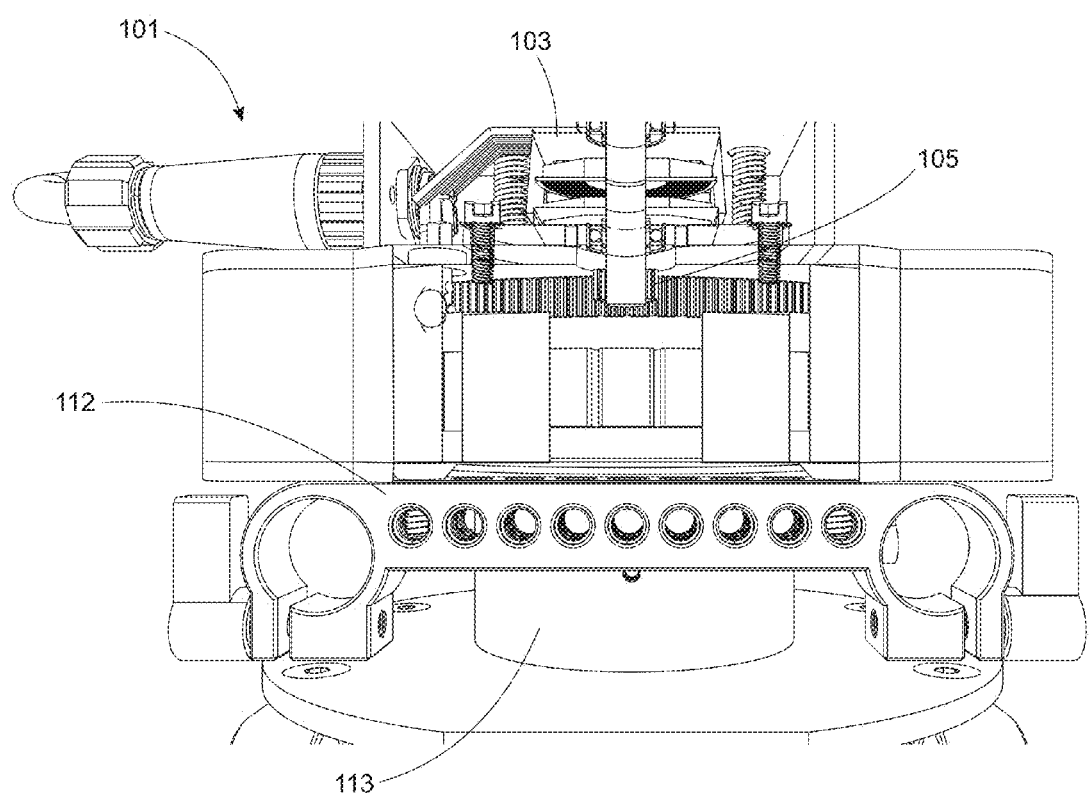
FIG. 6 is an assembled general top view of a direct drive motor in accordance with the present invention with the motor casing removed to expose the rotor and encoder mating.
Figure 7:
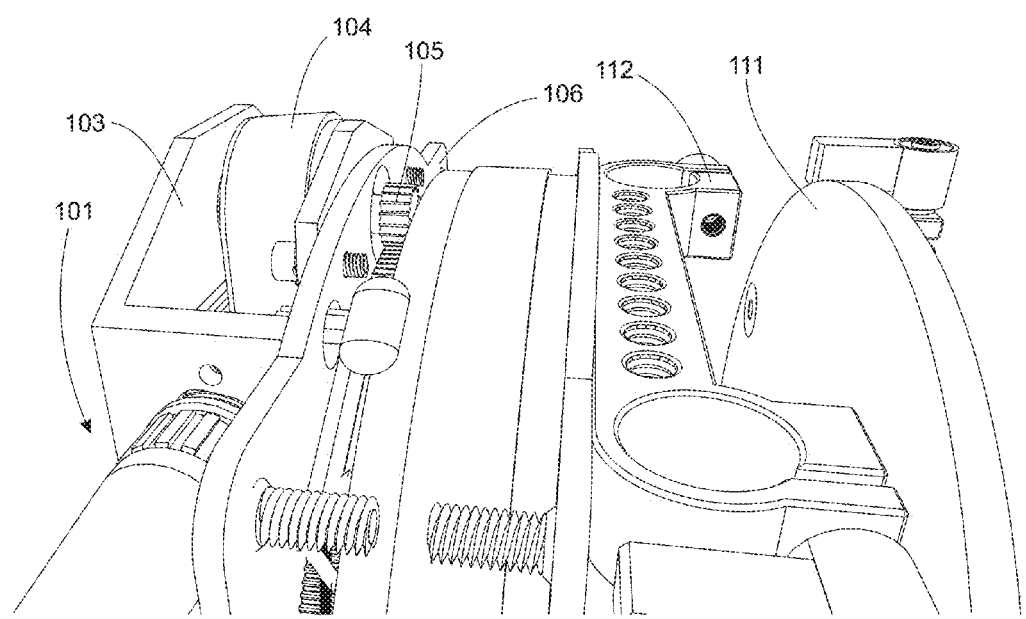
FIG. 7 is a close-up view of the rotor and encoder mating, with motor housing removed.

Ratio-metric multiplication is then achieved as follows. As seen in FIGS. 1-3, the encoder 104 attaches to the rear bearing plate 106 and is covered by the encoder housing 103, which serves to protect the encoder 104 and houses the connector jack 102, wherein the connector plug 101 mates. The silicone rubber sleeve 105 is affixed to the shaft of the encoder 104. As seen in FIGS. 6 and 7, the encoder 104 penetrates the rear bearing plate 106, extending sufficiently to cause the silicone rubber sleeve 105 to ride on the outer circumference of the rotor hub 107.

For illustrative purposes, a quadrature encoder with a resolution of 5,000 pulses per revolution (PPR) is used. A rotor hub with an outer circumference of 17.28 inches and a silicone rubber sleeve with an outer circumference of ca. 1.17 inches results in a ratio-metric multiplication of ca. 14.77 (17.28÷1.17). This results in an approximate total of 73,850 encoder pulses per motor revolution (5,000×14.77), which provides a resolution of about 0.00487 degrees (360÷73,850) or ca. 205.14 steps per degree (73,850÷360). Control circuitry that is capable of counting rising and falling edges of both the A and B quadrature channels achieves four times the encoder resolution, or ca. 295,400 PPR (73,850×4), about 0.00122 degrees and ca. 820.56 steps per degree.

Figure 8:
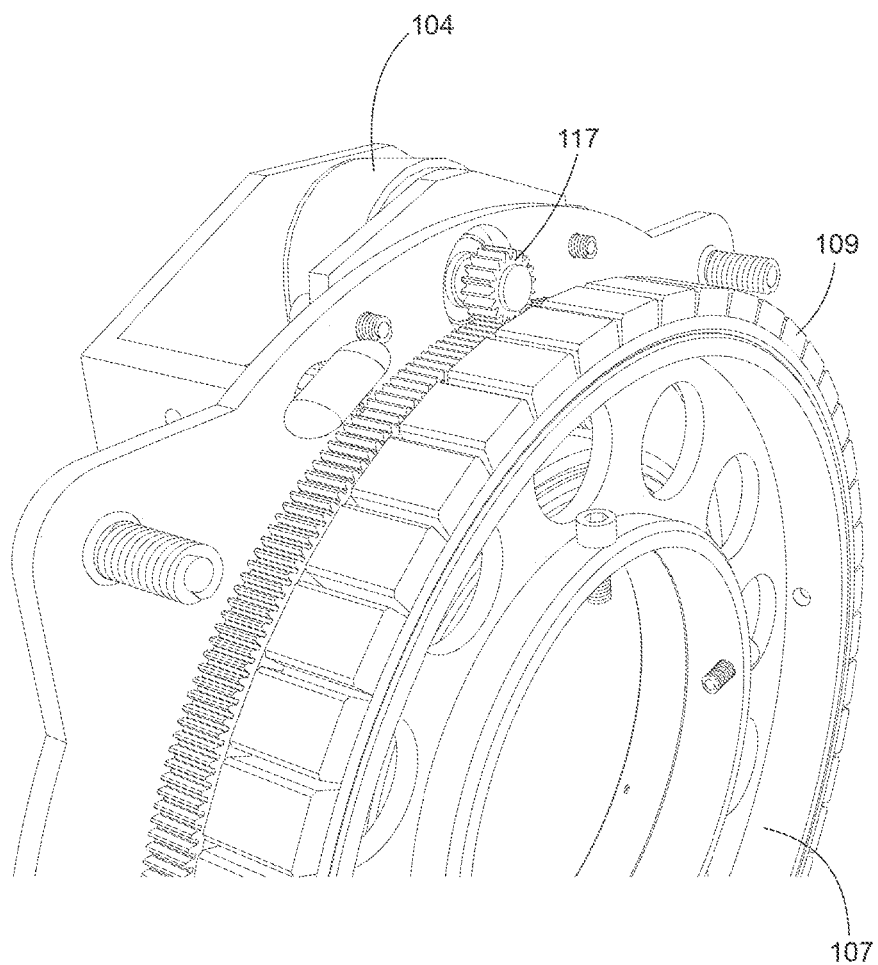
FIG. 8 is a close-up view of a gear drive assembly in accordance with an alternative embodiment of the present invention.

In an alternative embodiment, FIG. 8 depicts a gear drive assembly where the silicone rubber sleeve 105 is replaced with a spur gear 116 and a ring gear 17 is added. In this version, the encoder 104 mates with a rotor hub 107 modified with a ring gear 117 or gears machined into a portion of the outer rim. By virtually eliminating slippage, this alternative assembly provides higher repeatability and precision registration of the encoder 104 and the axle 113 compared to the friction assembly.

An additional Hall effects switch may be added with a small indexing magnet on the rotor hub to replace the index signal of the quadrature encoder to prevent miscalculation by the motor controller.

Flexibility has been added by the use of rod clamps 112 into the design, facilitating highly configurable mounting options in high precision robotic camera systems, automation, and industrial applications. In addition, the length of the axle 113 and location of where the rotor hub 107 is mounted on said axle can be adjusted to adapt the overall motor design to different uses and applications.

Computer-Controlled Camera System

Figure 9:
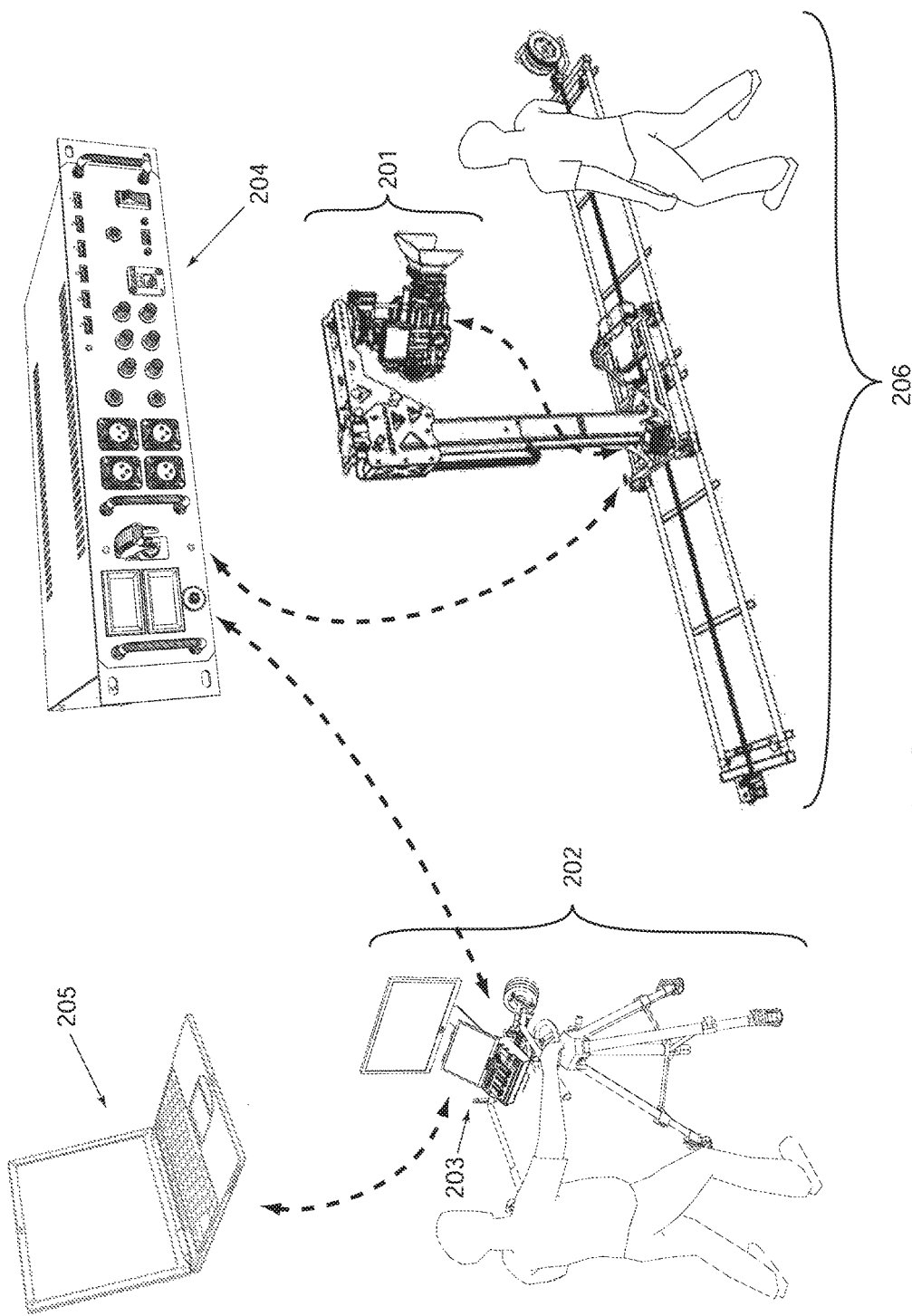
FIG. 9 is a flow diagram showing how the six main components interrelate in accordance with the present invention.
Figure 10:
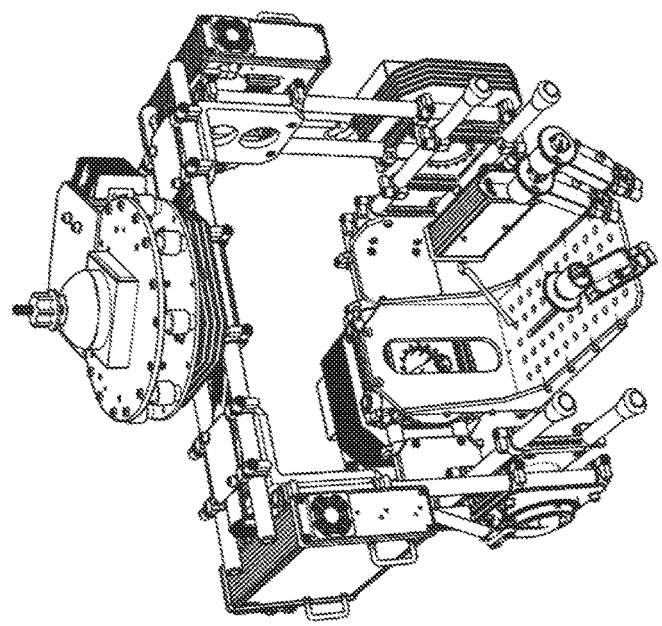
FIG. 10 shows textured (left) and monochrome (right) CAD renderings of the assembled camera gimbal in accordance with the present invention.
Figure 10:
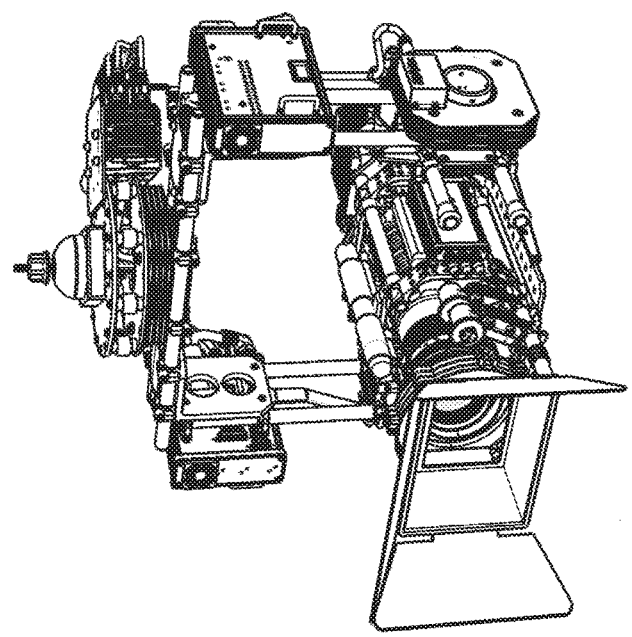
Figure 11:
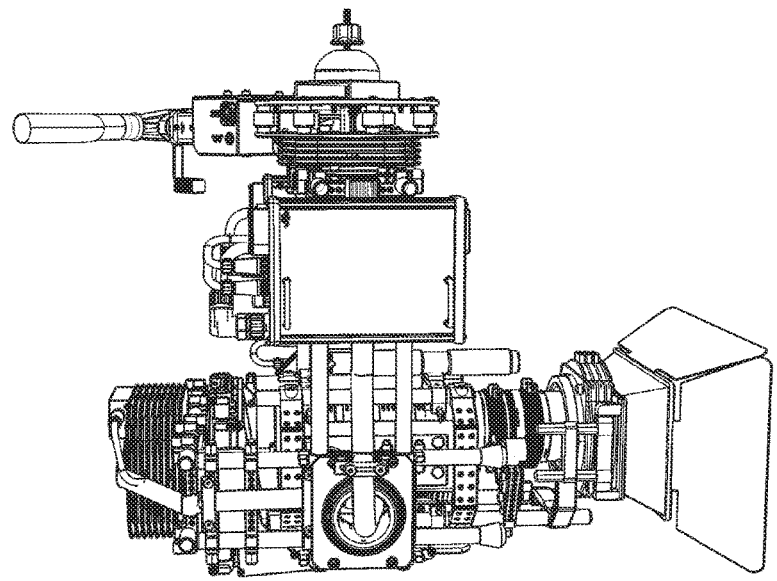
FIG. 11 is a photograph of the right side of the assembled camera gimbal in accordance with the present invention.
Figure 12:
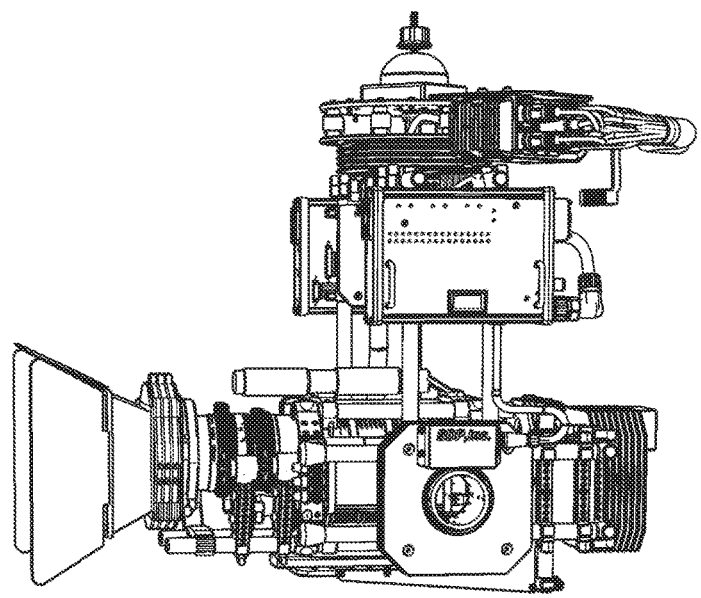
FIG. 12 is a photograph of the left side of the assembled camera gimbal in accordance with the present invention.
Figure 13:
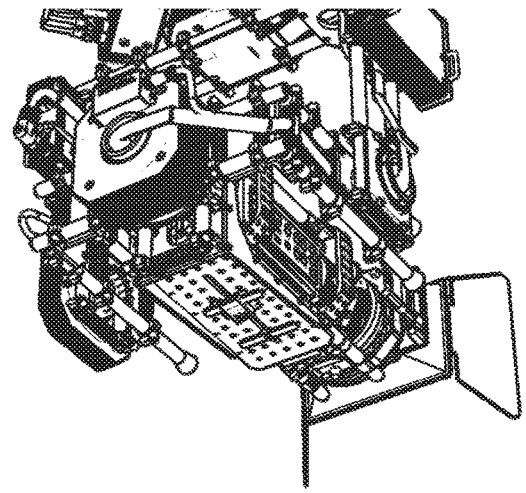
FIG. 13 is a photograph of the rear and under side of the assembled camera gimbal in accordance with the present invention.
Figure 14:
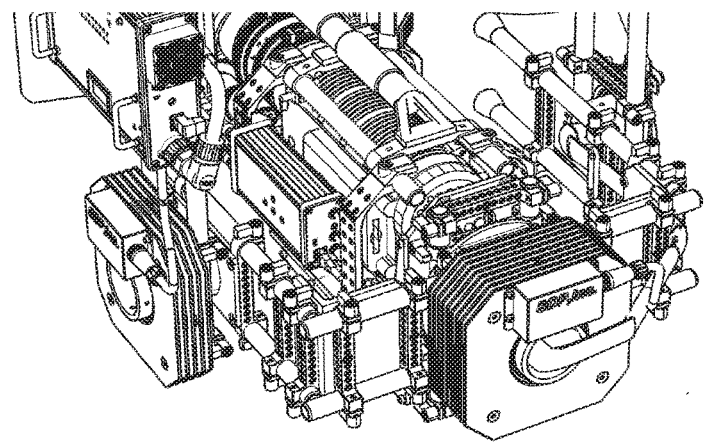
FIG. 14 is a photograph of the rear and top side of the assembled camera gimbal in accordance with the present invention

The robotic, gyroscopically stabilized, computer-controlled camera system is comprised of six main components, each designed specifically to work with the others:
1. A 3-axis camera gimbal
2. A pan-bar system
3. A robotic control unit
4. A master interconnect unit
5. Custom control software
6. A track and gantry system Referring to the drawings, FIG. 9 depicts a flow diagram of how the six components of the camera system interrelate. In a typical configuration, the robotic control unit 103, which is mounted on the pan-bar system 102, is the point where all command signals originate. Pan, tilt, roll, focus, zoom, and iris signals from the pan-bar system 102 are sent to the robotic control unit 103 via four RJ45 Ethernet cables. The robotic control unit 103 is connected via a USB cable to a laptop with the custom control software 105, enabling the software 105 to record, modify, and play back all eight axes of the camera gimbal 101 and the track and gantry system 106.

The robotic control unit 103 is connected to the master interconnect unit 104 via an Ethernet cable. The master interconnect unit 104 connects to a connector panel on the track and gantry system 106 via a custom multi-core cable consisting of four balanced audio camera inputs, one unbalanced stereo headphone from the camera, one unbalanced stereo monitor from the camera, one time-code input to the camera, one time-code output from the camera, one HD-SDI genlock to the camera, two HD-SDI 1080p monitor feeds from the camera, one HD-SDI 1080p preview monitor feed from the camera, one RJ45 Ethernet cable for GUI monitor feed from the camera, one RJ45 Ethernet cable for control signals to the camera, and one 24V DC 40-amp 12-gauge supply line for powering the track and gantry system 106.

Camera Gimbal 101

FIGS. 10-15 depict the camera gimbal, which is gyroscopically stabilized, capable of three-axis (i.e., pan, tilt, and roll) movement, powered by custom direct drive motors, and designed to meet all the requirements of modern high-end broadcast and film production.

The camera gimbal cage is comprised of 19 mm aluminum and steel rods, rod clamps, and L-brace supports at the corners. This design allows for adjustable configurations to accommodate one or multiple cameras of various sizes.

Three high precision, zero-cogging, direct drive, three-phase axial servo motors drive the pan, tilt, and roll axes; a fourth motor casing mirrors the tilt motor to provide balanced support. All four motors/motor casings are attached to the cage via rod clamps.

A camera is mounted on an L-shaped cheese plate, reinforced with side brackets, that is mounted to the roll motor. Three lens servo motors are attached with custom clamps, shown in FIG. 8, to rod clamps along a 19 mm rod paralleling the camera. A motor controller is also mounted on the same 19 mm rod.

A dual gyroscopic system is employed to stabilize the camera gimbal along three axes. A vibrational dampening system removes extraneous vibration outside of the capability of the gyroscopic stabilization system. The camera gimbal is mounted on one side of the pan motor. Attached to the other side of the dampening system are the master connector unit, the male receiver tube which connects the camera gimbal to the gantry turret arm, and a 24V to 13.6V voltage converter and heat sinks. The master connector unit contains four balanced analog audio female XLR input jacks, one ¼ inch stereo jack for left and right monitor audio output, one ¼ inch stereo jack for headphones output, one BNC connector for time-code input, one BNC connector for time-code output, one BNC connector for genlock input, two BNC connectors for HD-SDI output, one BNC connector for preview output, one RJ45 Ethernet connector for controller input, one RJ45 Ethernet connector for GUI monitor output, and one 24V DC 40 amp DC input connector.

Two shoulder boxes house the three-phase servo drivers, the gyroscopic correction circuitry, and the LED status panel, which provides LED indication of all control signals for diagnosis and troubleshooting.

Pan-Bar System 102

Figure 17:
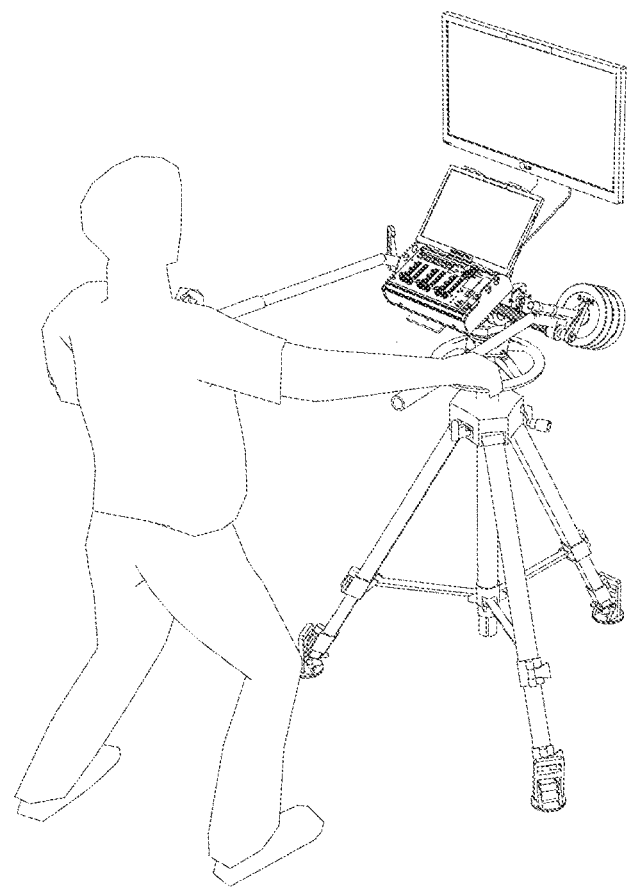
FIG. 17 is a monochrome CAD rendering of the assembled pan-bar system mounted with the 8-axis robotic control system in accordance with the present invention.
Figure 18:
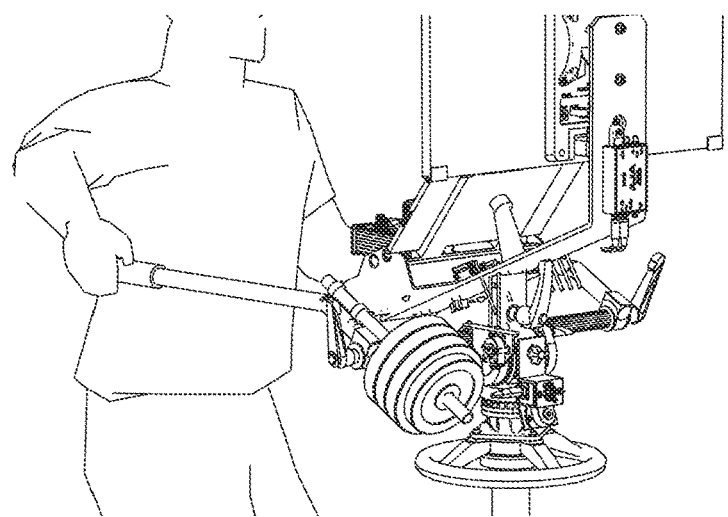
FIG. 18 is a close-up monochrome rendering of the assembled pan-bar system mounted with the 8-axis robotic control system in accordance with the present invention.
Figure 19:
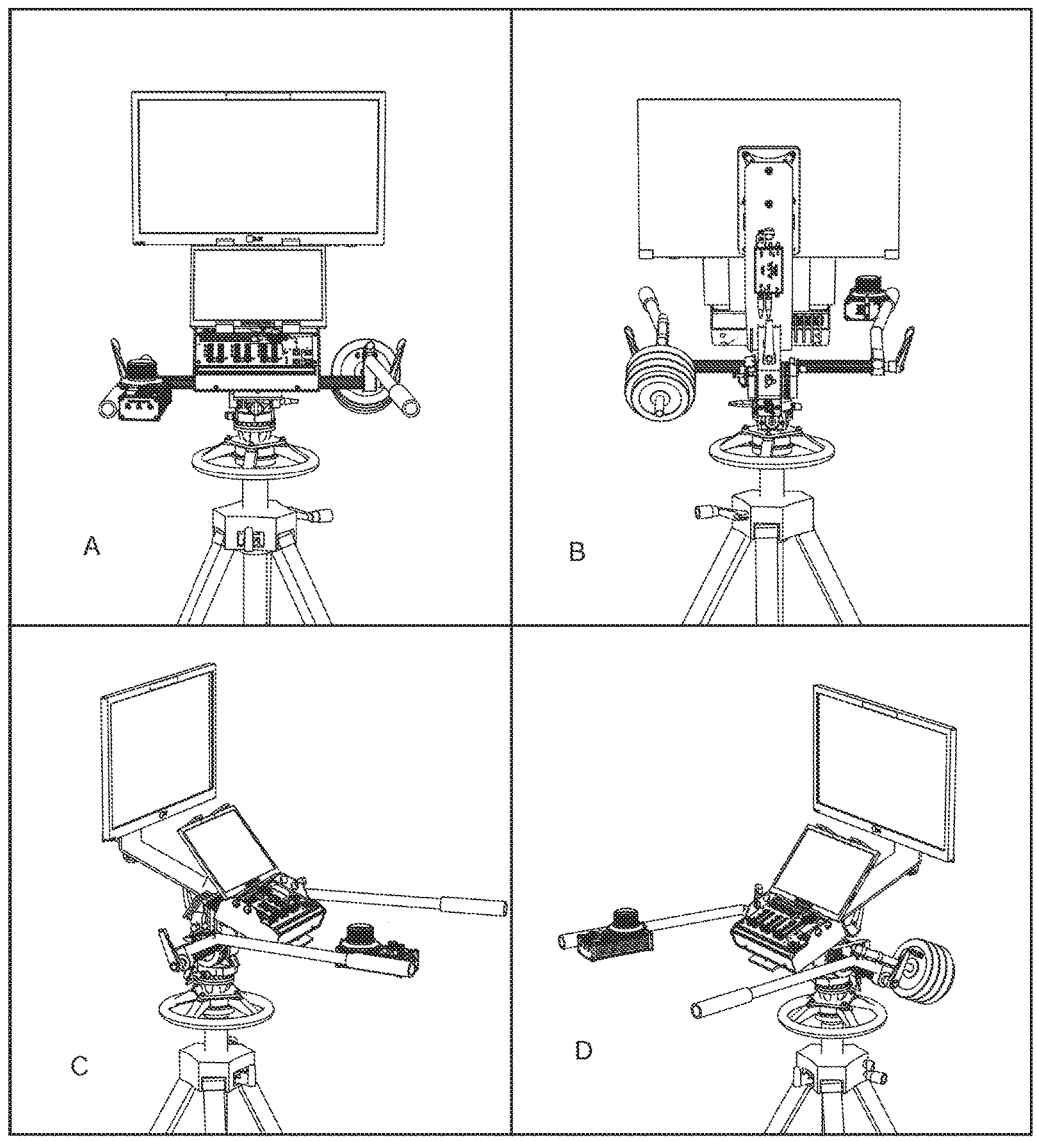
FIG. 19 shows four photographic views of the pan-bar system mounted with the 8-axis robotic control system in accordance with the present invention.

The pan-bar system, shown in FIGS. 17-19, consists of a tripod or other stable surface (e.g., a table); a fluid or friction camera tripod head; pan-bar handles for pan and tilt control; hand controls for zoom, focus, iris, and roll; and a mounting surface for the robotic control unit and a high resolution monitor. The camera tripod head may be basic (i.e., non-encoder equipped), in which a camera tripod head adapter and external encoders are necessary, or integrated (i.e., encoder equipped). Potentiometers are used for zoom and roll controls while encoders are used for focus and iris controls. All eight axes are connected to the robotic control unit via RJ45 Ethernet cables.

Robotic Control Unit 103

Figure 20:
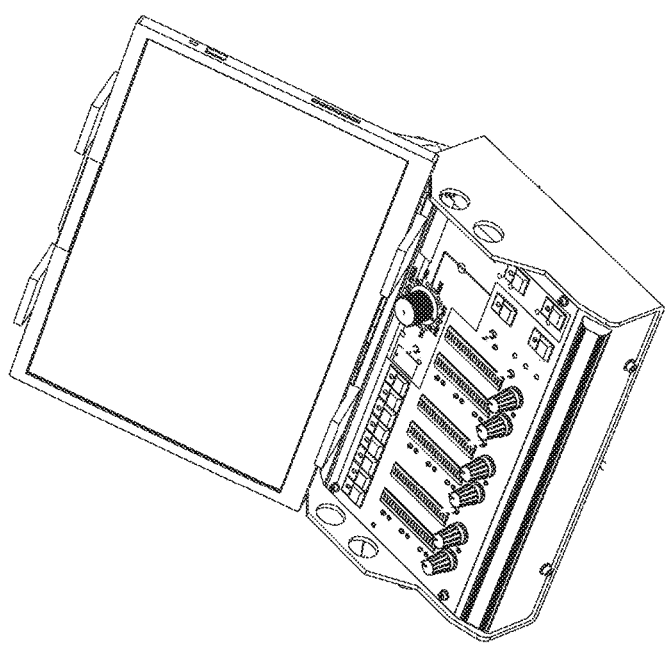
FIG. 20 is a textured CAD rendering of the 8-axis robotic control system in accordance with the present invention.

The robotic control unit, depicted in FIG. 20, is an 8-axis (i.e., pan, tilt, roll, zoom, focus, iris, track, and lift) controller that receives pan, tilt, roll, zoom, focus, and iris signals from the pan-bar system; sends signals to and receives signals from a laptop with the custom control software 105; and sends signals to and receives power from the master interconnect unit 104, all via RJ45 Ethernet cables. Input for track and lift axes are received from a separate control unit.

Among its many functions, the robotic control unit 103 generates scale and ramp information for each axis; enables the operator to set a minimum and maximum point for the movement of each axis; enables and disables gyroscopic correction; and converts all data to a proprietary serial data stream and sends it to both the master interconnect unit 104 and the laptop with the custom control software 105. The controller is capable of functioning with or without computer assistance.

The controller is a highly complex digital processing unit designed specifically to accomplish all the needed functions and is much more user friendly while remaining far more cost effective than existing controllers. The controller is comprised of a heavy duty shielded enclosure containing custom circuitry; twelve encoders, soft touch knobs, and color-coded LED bar displays for linear control of ramp and scale for the six axes; LED indicators for CPU present, transmit data, and receive data; trimmer potentiometers accessible through the front face plate with standard trimmer tool to adjust zero set and dead band for zoom and roll axes; five momentary contact switches with tactile click for panel lock, gyro enable/disable, system enable/disable, limit-set, and save/reset; and a rotary switch for setting the stop and start points for each axis.

A full-featured camera remote control unit may be attached to the robotic control unit depending upon the camera model used and availability of a factory-supplied remote control.

Master Interconnect Unit 104

The master interconnect unit 104 supplies 24V to the entire system, is responsible for monitoring voltage and current of a battery source and/or AC land voltage, and provides power to the system. The master interconnect unit 104 also is responsible for the interface of all audio, video, and control signals and provides up to six HDMI monitors for directors, focus pullers, etc.

The master interconnect unit is comprised of a 2 RU rack mountable case containing custom circuitry for handling USB to CANopen network protocols, conversion circuitry for Ethernet to HDMI conversion, voltage conversion and distribution, resettable safety circuit breakers, full 1×6 HDMI distribution amplifier, custom controller interface circuitry, floating 5V isolated supply for current-sensing display, 50 amp 100V shunt for current sensing, and one 120V 18 amp input to 24V 42 amp output switching power supply.

Figure 21:
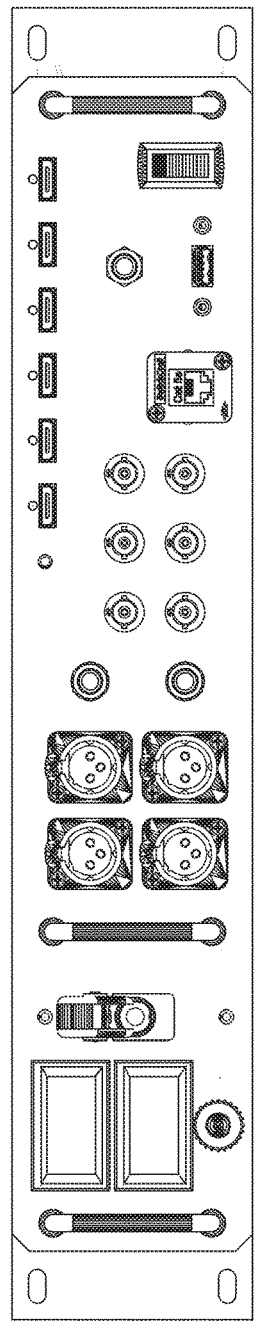
FIG. 21 is a photograph of the front panel of the master interconnect unit in accordance with the present invention.

The front face plate, as shown in FIG. 21, features LED displays for monitoring voltage levels and current draw, a flip-protected high current switch for selecting between battery and AC land input, four balanced analog audio female XLR input jacks, separate ¼ inch jacks for left and right monitor audio output, one BNC connector for time-code input, one BNC connector for time-code output, one BNC connector for genlock input, two BNC connectors for HD-SDI output, one BNC connector for preview output, one RJ45 Ethernet connector for controller input, one ¼ inch stereo jack for headphones output, one USB connector, six HDMI outputs with six indicator LEDs for up to six GUI monitors, and one power on/off switch.

Figure 22:
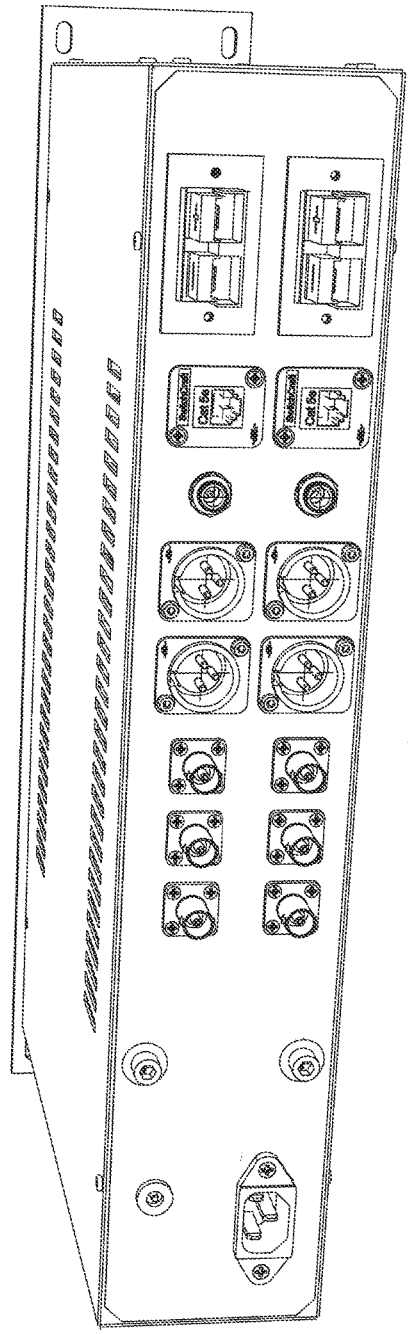
FIG. 22 is a textured CAD rendering of the master interconnect unit in accordance with the present invention.
Figure 23:
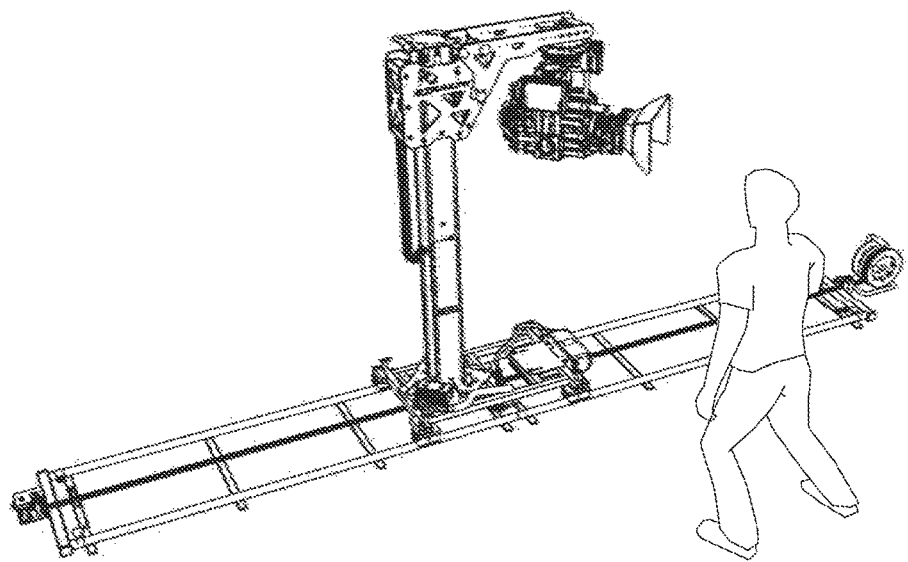
FIG. 23 is a textured CAD rendering of the track and gantry system with the camera gimbal mounted in accordance with the present invention.

The rear face plate, as depicted in FIG. 22, features one 24V DC accessory output, one 120V 18 amp AC input connector, one BNC connector for time-code input, one BNC connector for time-code output, one BNC connector for genlock output, one BNC connector for HD-SDI input, one BNC connector for second HD-SDI input, one BNC connector for preview input, four balanced analog audio male XLR output jacks, one ¼ inch stereo jack for left and right monitor audio input, one ¼ inch stereo jack for headphones input, one RJ45 Ethernet connector for controller output, one RJ45 Ethernet connector for GUI monitor input, one 24V DC 40 amp output connector, and one 24V DC 40 amp battery input connector.

Custom Control Software 105

The custom control software records, modifies, and plays back complex multi-axis camera movements and is capable of running on a standard PC laptop or desktop computer. The software receives signals from and sends signals to the robotic control unit 102 via an RJ45 Ethernet cable. Through the recording function, the software enables the system to work with special effects software, where the image filmed with the system must be precisely frame-matched with computer generated imagery and/or virtual environments.

Track and Gantry System 106

Figure 15:
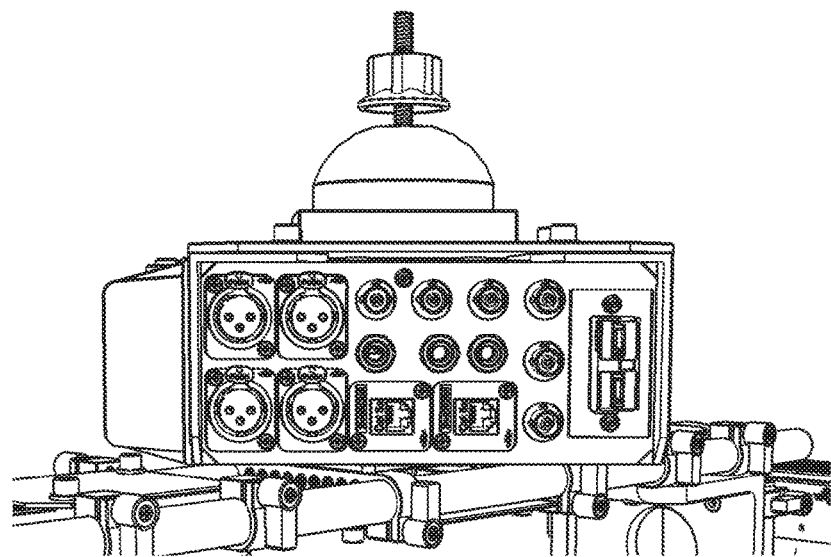
FIG. 15 is a photograph of the dampening system and the master connector head of the assembled camera gimbal in accordance with the present invention.
Figure 16:
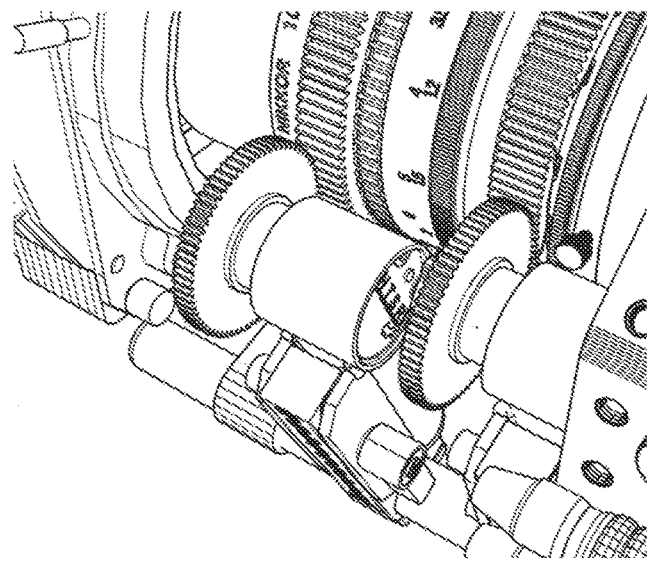
FIG. 16 is a photograph of a lens motor clamp in accordance with the present invention.

FIG. 15 illustrates the track and gantry system, the purpose of which is to move the camera gimbal vertically along the gantry and horizontally along the track.

The track is constructed of aluminum I-beam and ⅛ inch angle aluminum forming a very rigid yet very light track system. Sections of track are latched together to a desired length.

The gantry platform consists of ¼ inch plate aluminum with a welded aluminum channel frame. On each corner of the platform, two rows of four precision camera dolly wheels are mounted at right angles to ride on a 90-degree corner track.

Affixed to the gantry platform is the gantry column, housing for batteries, charging systems, and serial decode circuitry for the gantry lift motor and the gantry track motor. The gantry platform also contains the interconnect panel that interfaces between the master interconnect unit 104 and the camera gimbal 101.

Figure 24:
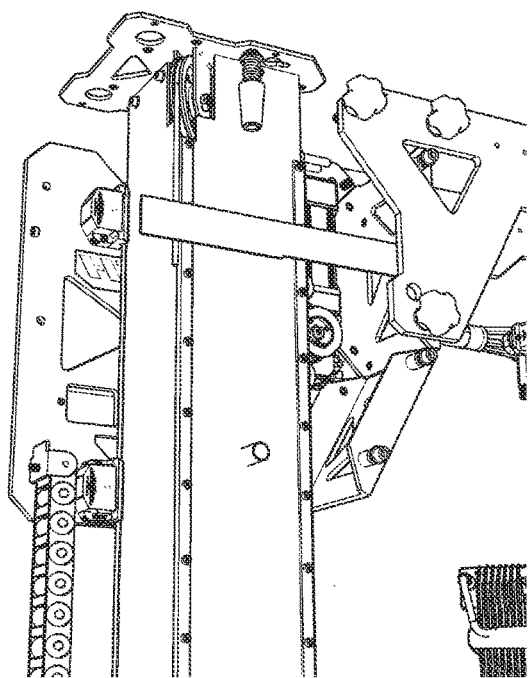
FIG. 24 is a textured CAD rendering of the gantry turret in accordance with the present invention.

The 8-foot-tall gantry column is constructed of an 8×8 inch hollow aluminum column bolted to the gantry platform. The frame of the gantry turret, as shown in FIG. 24, is of aluminum construction with two precision stainless steel V-groove wheels and six precision nylon V-groove wheels designed to ride on the corners of the gantry column. The camera gimbal is mounted in an overslung or underslung position on an arm extending from the gantry turret.

Two high precision zero-cogging direct drive servo motors drive the platform along the track and the turret up and down the gantry column. The motors are coupled with encoders attached to rotor hubs via a small cog pulley and cog belt, and the motor axle drives a right-angle gear box, which turns a larger cog pulley, engaging a cog belt. A cog belt spool system lengthens according to the length of the track and is used by the gantry platform motor to move the platform along the track.

Universal Camera Tripod Head Adapter

The present invention relates to a tripod camera head adapter for use with remote camera control systems.

Figure 25:
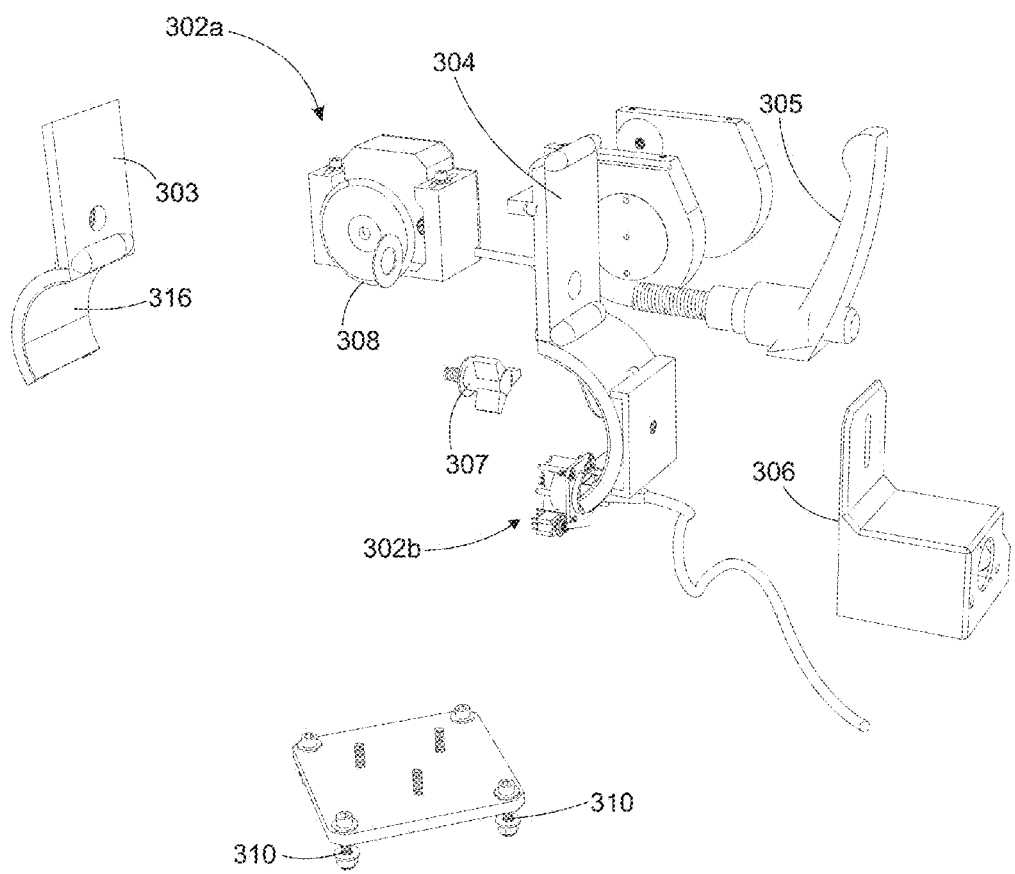
FIG. 25 is an exploded view of a tripod camera head adapter in accordance with the present invention.
Figure 26A:
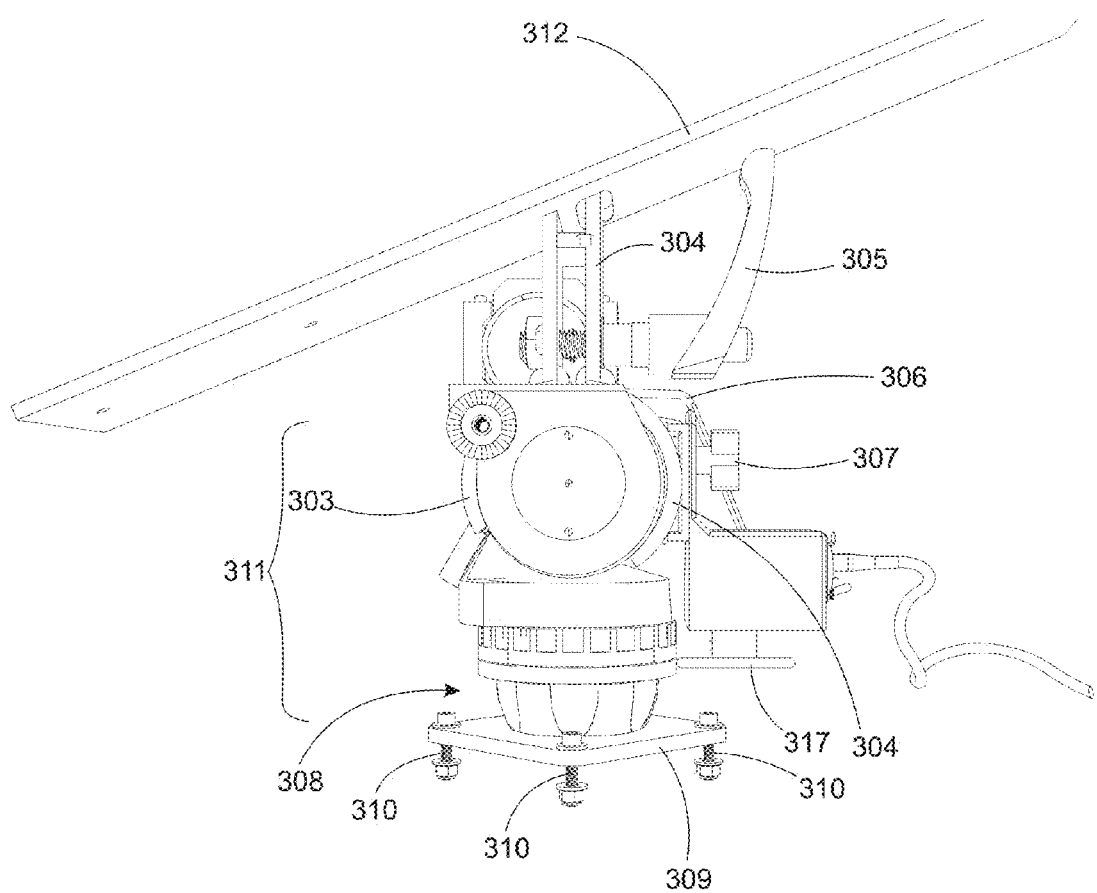
FIG. 26A is an assembled general side view of a tripod camera head adapter in accordance with the present invention. Labels for screws/fasteners are omitted for clarity.
Figure 26B:
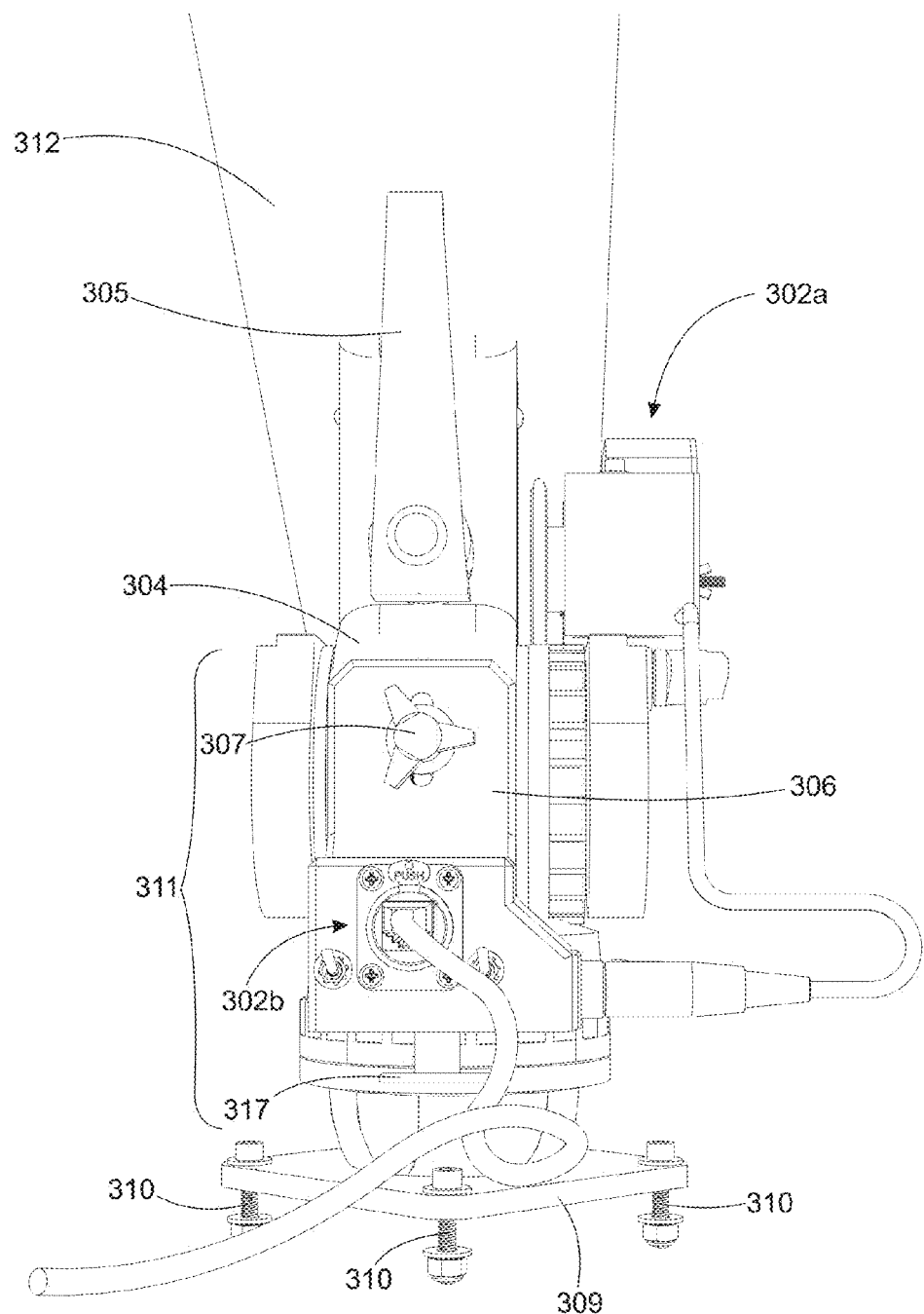
FIG. 26B is an assembled general rear view of a tripod camera head adapter in accordance with the present invention. Labels for screws/fasteners are omitted for clarity.
Figure 27:
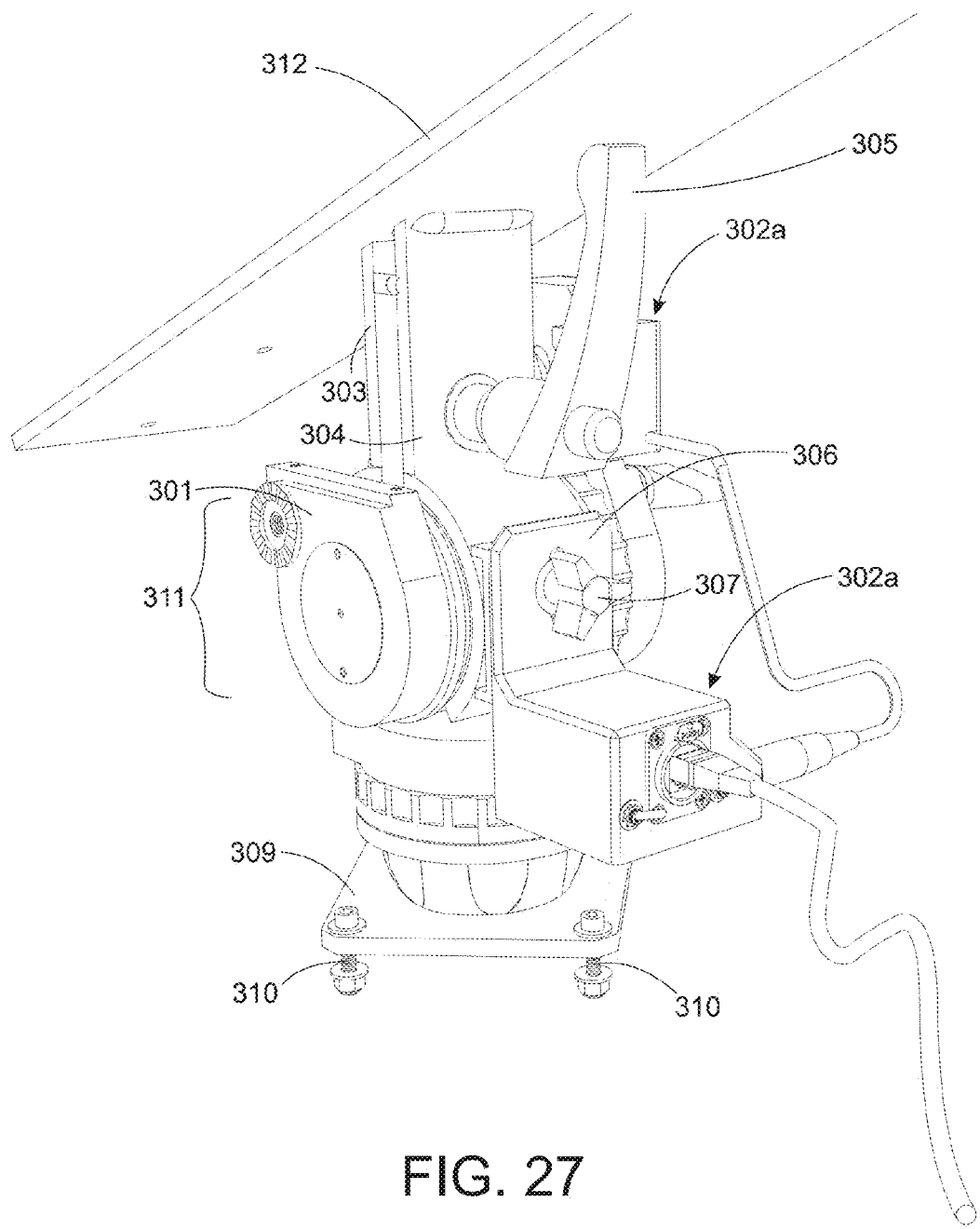
FIG. 27 is a perspective view of a tripod camera head adapter in accordance with the present invention.

Referring to the drawings, FIGS. 25-27 depict an exploded view, side and rear views of an assembled tripod camera head adapter, and a photographic representation of a tripod camera head adapter in accordance with the present invention. The adapter may include a front body clamp 203 and rear body clamp 204, a clamp handle 205, a tilt encoder bracket 201, a pan encoder bracket 206, a pan encoder bracket clamp 207, and a ball adapter plate 209. The adapter may further include a tilt encoder 202a, a pan encoder 202b, and a silicone rubber sleeve 208 affixed to the shaft of each encoder 202a/b to ride on the tripod camera head 211, as will be discussed in greater detail with respect to FIGS. 28-30. Further still, the adapter may include an accessory mounting plate 212. In an alternative embodiment, the ball adapter plate 209 can be replaced with a ball spacer 214, as will be discussed further with respect to FIG. 31. In an alternative embodiment, the silicone rubber sleeve 209 can be replaced with a friction drive wheel 216 to ride on the external face of the stationary portion of the pan axis on the tripod camera head 211, as will be discussed further with respect to FIG. 32A. In an alternative embodiment, a connector housing 217 with directional switches 218 can be added, as will be discussed further with respect to FIG. 32B. Screws/fasteners 210 are used to connect parts.

Assembly of the illustrative adapter is discussed in connection with FIGS. 25-27. The front body clamp 203 and rear body clamp 204 bolt together by way of the clamp handle 205 to form the tripod camera head adapter clamp. A thin rubber lining 216 is placed between the front body clamp 203 and read body clamp 204 and the tripod camera head 211 to improve the grip of the adapter to the tripod camera head 211.

The pan encoder 202b is mounted on the pan encoder bracket 206 with screws/fasteners 210. A silicone rubber sleeve 208 is affixed to the shaft of the pan encoder 202b. The assembled pan encoder bracket 206 is attached to the rear body clamp 204 by way of the pan encoder bracket clamp 207.

The tilt encoder 202a is mounted to the tilt encoder bracket 201 with screws/fasteners 210. A silicone rubber sleeve 208 is affixed to the shaft of the tilt encoder 202a. The assembled tilt encoder bracket 201 is attached to the tripod camera head 211 by way of screws/fasteners 210 using existing screw holes in the tripod camera head 211.

Figure 28:
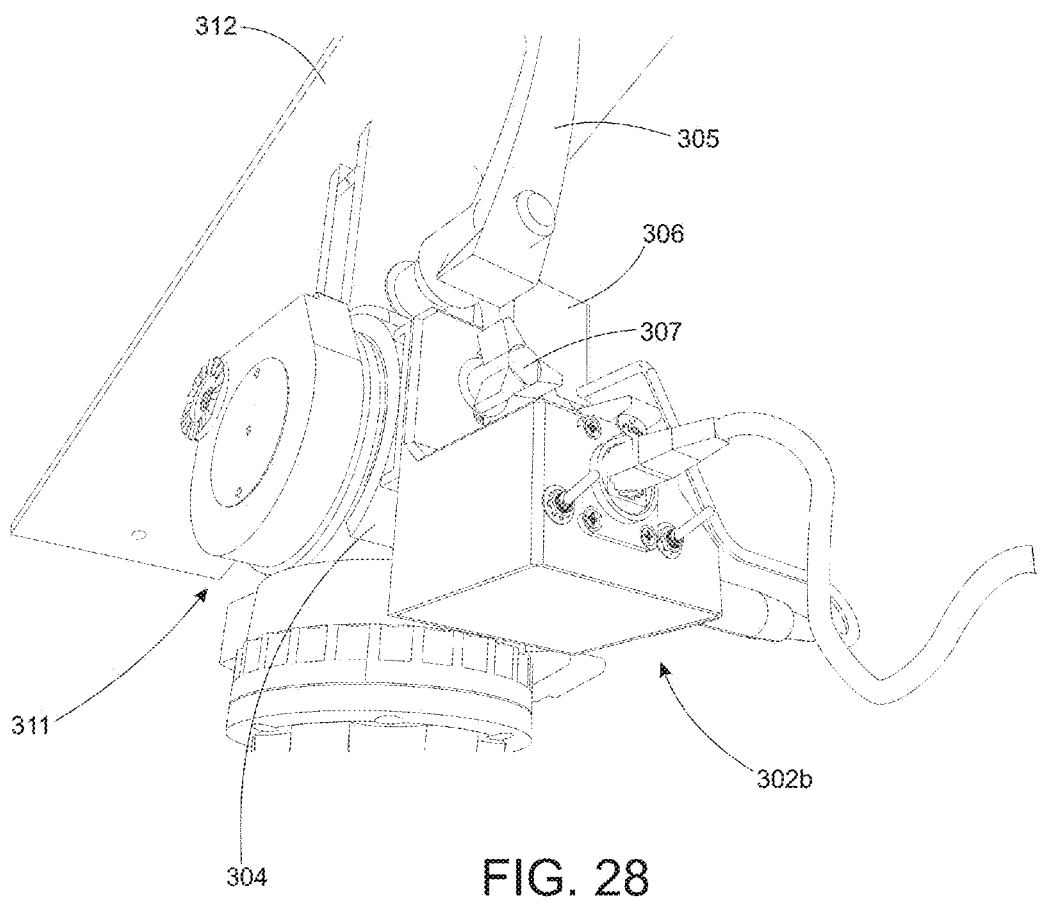
FIG. 28 is another perspective view of the assembled adapter showing how the encoder mates with a fluid head for the tilt function in accordance with the present invention.
Figure 29:
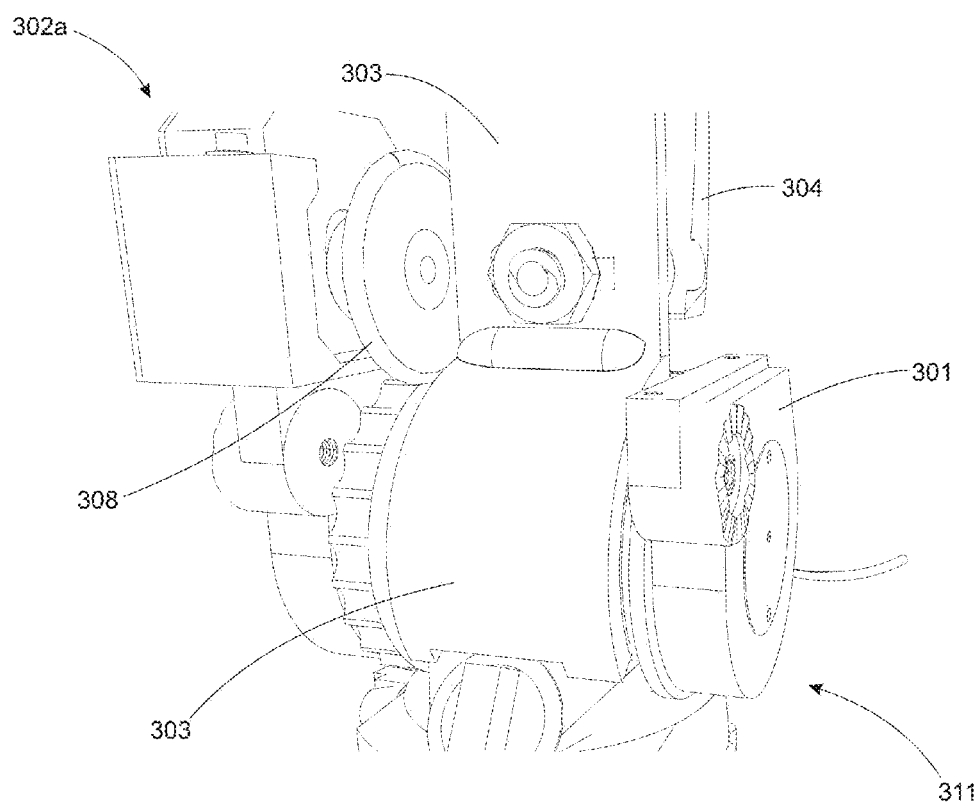
FIG. 29 is a another view of the adapter of FIG. 28.
Figure 30:
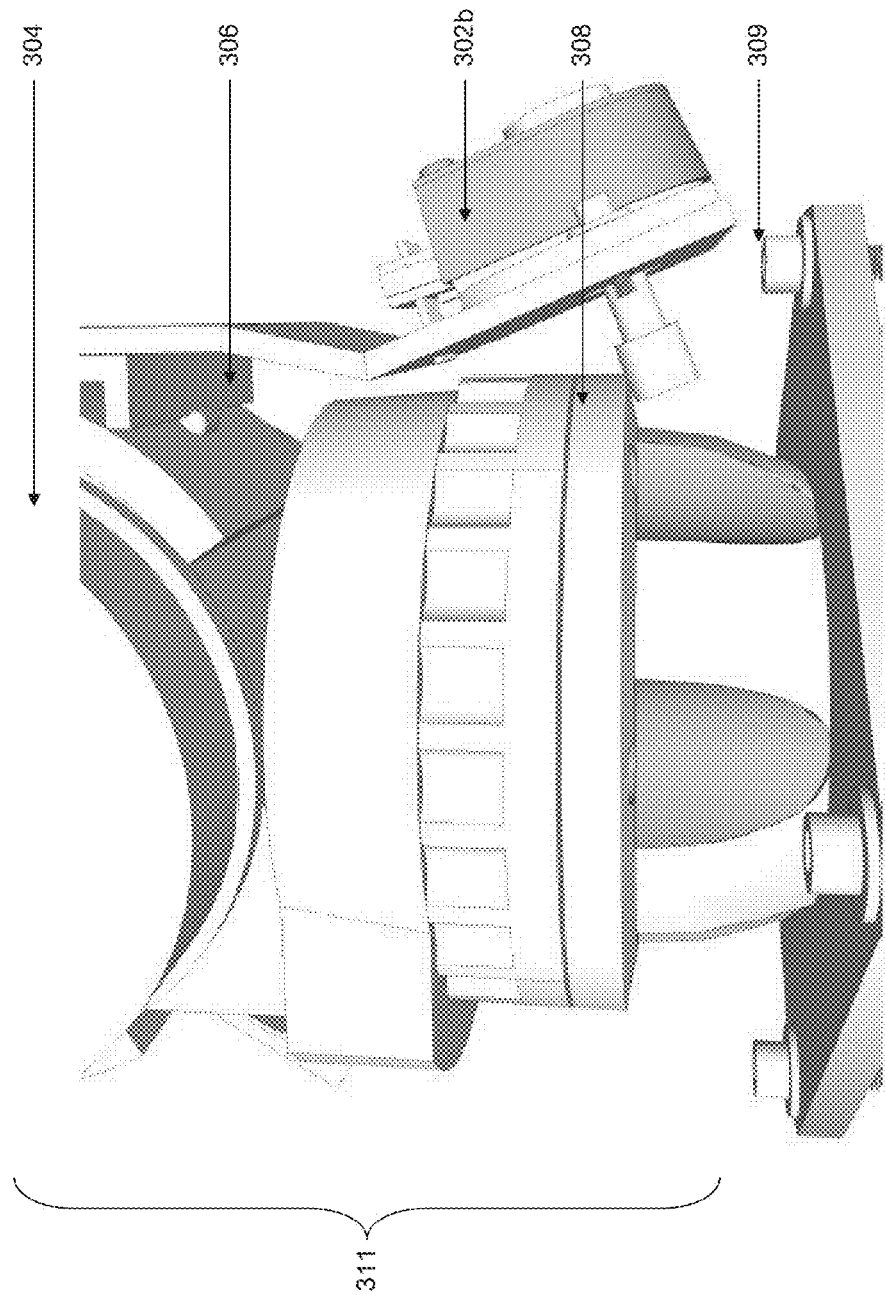
FIG. 30 is a close-up view of the assembled adapter showing how the encoder mates with a fluid head for the pan function in accordance with the present invention.

As seen in FIGS. 28 and 29, the shaft of the tilt encoder 202a penetrates the tilt encoder bracket 201, extending sufficiently to allow the silicone rubber sleeve 208 to ride on the tilt axis lip of the tripod camera head 211. Similarly, as seen in FIGS. 30 and 31, the shaft of the pan encoder 202b penetrates the pan encoder plate 206, extending sufficiently to allow the silicone rubber sleeve 208 to ride on the pan axis lip of the tripod camera head 211.

The ball adapter plate 209 is attached to the tripod camera head 211 by way of screws/fasteners 210. The ball adapter plate 209 is attached to a tripod 213 or other surface by way of screws/fasteners 210.

Figure 31:
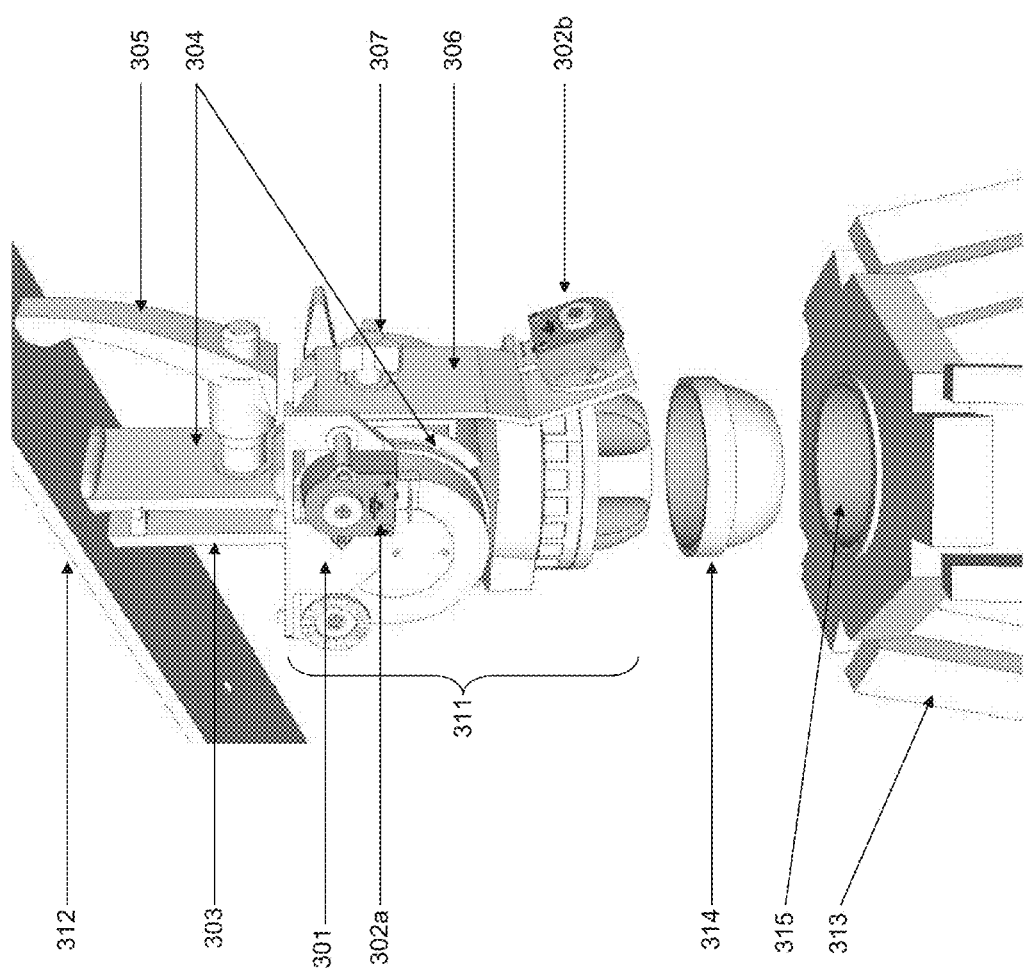
FIG. 31 is a partially exploded view of an alternative embodiment where a ball spacer replaces the ball adapter plate for attaching to a tripod with a bowl receiver.

In an alternative embodiment, FIG. 31 depicts a modified version of the illustrative tripod camera head adapter where the ball adapter plate 209 is replaced with a ball spacer 214. This creates sufficient clearance for the pan encoder 202b to mate with the pan axis lip of the tripod camera head 211 when the tripod camera head 211 is attached to a tripod 213 with a bowl receiver 215.

In an alternative embodiment, FIG. 32A depicts a modified version of the illustrative tripod camera head adapter where the silicone rubber sleeve 209 is replaced with a friction drive wheel 216. This allows different mounting configurations to accommodate different tripod camera head designs. For example, the friction drive wheel 216 can ride along the external face rather than the lower edge/lip of the pan axis of the tripod camera head 211, allowing the tripod camera head 211 to attach to a tripod 213 with a bowl receiver 215 without a ball spacer 214.

In an alternative embodiment, FIG. 32B depicts a modified version of the illustrative tripod camera head adapter where a connector housing 217 is attached to the pan encoder bracket 206 to simplify connection to a controller with processing electronics. Directional switches 218 may also be added to accommodate user preferences based on different robotic camera control system setups.

An optional accessory mount plate 212 can be attached to the top of the assembled tripod camera head adapter via welding or other means for the purpose of mounting monitors, controllers, and other accessories.

The illustrative version of the adapter was designed for use with 25 different tripod camera heads but can be modified to fit virtually any existing and future basic tripod camera heads.

The components defining any direct drive motor; any robotic, gyroscopically stabilized, computer controlled camera system; or any tripod camera head adapter according to embodiments of the invention may be formed of any of many different types of materials or combinations thereof that can readily be formed into shaped objects provided that the components selected are consistent with the intended operation of a direct drive motor according to embodiments of the invention. For example, the components may be formed of: metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; any other suitable material; and/or any combination thereof.

Furthermore, the components defining any direct drive motor; any robotic, gyroscopically stabilized, computer controlled camera system; or any tripod camera head adapter according to embodiments of the invention may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A three-phase direct drive axial servo motor comprising:
   an outer stator;
   an inner rotor comprising:
      a ring of rare earth magnets positioned inside the outer stator;
      a rotor hub that is spoked having an inside portion to which an axle is fixed; and
      an inner bearing and an outer bearing for supporting the axle;
   an encoder having a shaft and fastened to a rear bearing plate; and
   a silicone rubber sleeve affixed to the shaft of the encoder, wherein the sleeve rides on the rotor hub.

2. The motor of claim 1, wherein the encoder engages the rotor hub of the motor.

3. The motor of claim 1, wherein the encoder is a low resolution encoder.

4. The motor of claim 3, wherein the rotor hub with the silicone rubber sleeve coupled to it creates a ratio-metric multiplication to improve the resolution of the low resolution encoder.

5. The motor of claim 1, further comprising front and rear heavy duty precision bearings seated in the front and rear bearing plates and walls respectively.

6. The motor of claim 1, wherein the axle is separate from an axle plate to provide multiple mounting options.

* * * * *